US009576429B2

(12) United States Patent
Elias

(10) Patent No.: US 9,576,429 B2
(45) Date of Patent: Feb. 21, 2017

(54) SYSTEMS AND METHODS FOR SITE-WIDE JACKPOTS

(71) Applicant: Gamesys Ltd., London (GB)

(72) Inventor: Hans Elias, St. Albans (GB)

(73) Assignee: Gamesys Ltd., London (GB)

( * ) Notice: Subject to any disclaimer, the term of this patent is extended or adjusted under 35 U.S.C. 154(b) by 0 days.

(21) Appl. No.: 14/549,849

(22) Filed: Nov. 21, 2014

(65) Prior Publication Data

US 2015/0141135 A1 May 21, 2015

Related U.S. Application Data

(60) Provisional application No. 61/906,997, filed on Nov. 21, 2013.

(51) Int. Cl.
*G06F 17/00* (2006.01)
*G07F 17/32* (2006.01)

(52) U.S. Cl.
CPC ................................ *G07F 17/3258* (2013.01)

(58) Field of Classification Search
None
See application file for complete search history.

(56) References Cited

U.S. PATENT DOCUMENTS

| | | | |
|---|---|---|---|
| 5,564,700 | A | 10/1996 | Celona |
| 5,697,844 | A | 12/1997 | Kohorn |
| 5,713,795 | A | 2/1998 | Kohorn |
| 5,951,011 | A | 9/1999 | Potter et al. |
| 6,146,273 | A | 11/2000 | Olsen |
| 6,325,375 | B1 | 12/2001 | Potter et al. |
| 6,347,996 | B1 | 2/2002 | Gilmore et al. |
| 7,044,468 | B2 | 5/2006 | Sklansky et al. |
| 7,056,208 | B2 | 6/2006 | Cogert |
| 7,070,505 | B2 | 7/2006 | Vancura et al. |
| 7,169,041 | B2 | 1/2007 | Tessmer et al. |
| 7,530,896 | B2 | 5/2009 | Gauselmann |
| 7,562,876 | B2 | 7/2009 | Sklansky et al. |
| 7,575,517 | B2 | 8/2009 | Parham et al. |
| 7,674,168 | B2 | 3/2010 | Gerrard et al. |
| 7,841,933 | B2 | 11/2010 | Maul |
| 7,883,409 | B2 | 2/2011 | Little et al. |
| 7,954,821 | B2 | 6/2011 | Reabe, Jr. |
| 7,962,362 | B2 | 6/2011 | Huang et al. |
| 7,963,847 | B2 | 6/2011 | Baerlocher |
| 8,007,364 | B2 | 8/2011 | Moreno |
| 8,012,014 | B2 | 9/2011 | Low et al. |

(Continued)

FOREIGN PATENT DOCUMENTS

| | | |
|---|---|---|
| WO | WO2012064913 | 5/2012 |
| WO | WO2012139194 | 10/2012 |

(Continued)

OTHER PUBLICATIONS

International Search Report for PCT/US2014/066758 dated Mar. 12, 2015; 2 pps.

(Continued)

*Primary Examiner* — Paul A D'Agostino

(74) *Attorney, Agent, or Firm* — Fincham Downs, LLC; Carson C. K. Fincham

(57) ABSTRACT

Systems, methods, and articles of manufacture provide for site-wide and/or community jackpots.

13 Claims, 20 Drawing Sheets

(56) References Cited

U.S. PATENT DOCUMENTS

| | | | |
|---|---|---|---|
| 8,021,230 | B2 | 9/2011 | Baerlocher et al. |
| 8,100,760 | B2 | 1/2012 | Cannon |
| 8,105,149 | B2 | 1/2012 | DeWaal |
| 8,128,091 | B2 | 3/2012 | Snow et al. |
| 8,141,877 | B2 | 3/2012 | Santiago |
| 8,157,646 | B2 | 4/2012 | Pawloski et al. |
| 8,162,748 | B2 | 4/2012 | Goldschmidt |
| 8,197,340 | B2 | 6/2012 | Garvey et al. |
| 8,235,784 | B2 | 8/2012 | Christensen |
| 8,235,811 | B2 | 8/2012 | Joshi et al. |
| 8,251,791 | B2 | 8/2012 | Baerlocher et al. |
| 8,328,635 | B2 | 12/2012 | Oosthoek |
| 8,337,300 | B2 | 12/2012 | Bowers et al. |
| 8,337,311 | B2 | 12/2012 | Amos et al. |
| 8,342,927 | B2 | 1/2013 | Englman et al. |
| 8,342,957 | B2 | 1/2013 | Carpenter et al. |
| 8,348,739 | B2 | 1/2013 | Bell et al. |
| 8,348,753 | B2 | 1/2013 | Low et al. |
| 8,353,765 | B2 | 1/2013 | Goldschmidt |
| 8,360,843 | B2 | 1/2013 | Barclay et al. |
| 8,360,844 | B2 | 1/2013 | Schwartz et al. |
| 8,371,919 | B2 | 2/2013 | Hornik et al. |
| 8,376,837 | B2 | 2/2013 | Gagner et al. |
| 8,388,438 | B2 | 3/2013 | Englman et al. |
| 8,393,948 | B2 | 3/2013 | Allen et al. |
| 8,408,994 | B2 | 4/2013 | Baerlocher et al. |
| 8,449,367 | B2 | 5/2013 | Kitamura et al. |
| 8,449,388 | B2 | 5/2013 | Nicely et al. |
| 8,469,788 | B2 | 6/2013 | Carpenter et al. |
| 8,475,277 | B2 | 7/2013 | Palmisano et al. |
| 8,500,533 | B2 | 8/2013 | Lutnick et al. |
| 8,506,405 | B2 | 8/2013 | Allen et al. |
| 8,512,137 | B2 | 8/2013 | Hayes et al. |
| 8,512,149 | B2 | 8/2013 | Walker et al. |
| 8,517,810 | B2 | 8/2013 | Vann |
| 8,517,818 | B2 | 8/2013 | Nicely et al. |
| 8,523,650 | B2 | 9/2013 | Kelly et al. |
| 8,529,338 | B2 | 9/2013 | Allen et al. |
| 8,535,146 | B2 | 9/2013 | Olsen |
| 8,535,147 | B2 | 9/2013 | Ward |
| 8,535,148 | B2 | 9/2013 | Vallejo et al. |
| 8,535,156 | B2 | 9/2013 | Roireau |
| 2003/0022719 | A1 | 1/2003 | Donald et al. |
| 2003/0176216 | A1 | 9/2003 | Storey |
| 2004/0102243 | A1 | 5/2004 | Olsen |
| 2006/0234796 | A1 | 10/2006 | Nobrega et al. |
| 2007/0077981 | A1 | 4/2007 | Hungate et al. |
| 2007/0259711 | A1 | 11/2007 | Thomas |
| 2008/0108430 | A1 | 5/2008 | Evans |
| 2008/0113765 | A1* | 5/2008 | DeWaal .......................... 463/25 |
| 2009/0011833 | A1 | 1/2009 | Seeling et al. |
| 2009/0042644 | A1 | 2/2009 | Zielinski |
| 2010/0120492 | A1 | 5/2010 | Davis et al. |
| 2010/0121695 | A1 | 5/2010 | Ward et al. |
| 2011/0212767 | A1 | 9/2011 | Barclay et al. |
| 2011/0230252 | A1 | 9/2011 | Davis et al. |
| 2012/0004747 | A1 | 1/2012 | Kelly et al. |
| 2012/0015708 | A1 | 1/2012 | Kroeckel et al. |
| 2012/0088572 | A1 | 4/2012 | Kelly et al. |
| 2012/0094752 | A1 | 4/2012 | Cannon |
| 2012/0109344 | A1 | 5/2012 | Kelly et al. |
| 2012/0122583 | A1 | 5/2012 | Alexiadis |
| 2012/0142409 | A1 | 6/2012 | Kelly et al. |
| 2012/0178524 | A1 | 7/2012 | Boyd et al. |
| 2012/0184365 | A1 | 7/2012 | Pawloski et al. |
| 2012/0190435 | A1 | 7/2012 | Muir |
| 2012/0276986 | A1 | 11/2012 | Baerlocher et al. |
| 2012/0283004 | A1 | 11/2012 | Joshi et al. |
| 2012/0283006 | A1 | 11/2012 | Baerlocher et al. |
| 2013/0029745 | A1 | 1/2013 | Kelly et al. |
| 2013/0079123 | A1 | 3/2013 | Nicely et al. |
| 2013/0102382 | A1 | 4/2013 | Barclay et al. |
| 2013/0122978 | A1 | 5/2013 | Slomiany et al. |
| 2013/0130781 | A1 | 5/2013 | Anderson et al. |
| 2013/0137500 | A1 | 5/2013 | Kelly et al. |
| 2013/0137503 | A1 | 5/2013 | Baerlocher |
| 2013/0137506 | A1 | 5/2013 | Low et al. |
| 2013/0143649 | A1 | 6/2013 | Allen et al. |
| 2013/0165218 | A1* | 6/2013 | Bond et al. ..................... 463/26 |
| 2013/0165219 | A1 | 6/2013 | Kelly et al. |
| 2013/0178260 | A1 | 7/2013 | Baerlocher et al. |
| 2013/0184062 | A1 | 7/2013 | Allen et al. |
| 2013/0196752 | A1 | 8/2013 | Wright et al. |
| 2013/0210515 | A1 | 8/2013 | Snow et al. |
| 2013/0225267 | A1 | 8/2013 | Koch et al. |
| 2013/0237312 | A1 | 9/2013 | Palmisano |

FOREIGN PATENT DOCUMENTS

| | | |
|---|---|---|
| WO | WO2013033048 | 3/2013 |
| WO | WO2013048923 | 4/2013 |
| WO | WO2013082552 | 6/2013 |
| WO | WO2013096514 | 6/2013 |
| WO | WO2013104022 | 7/2013 |
| WO | WO2013109790 | 7/2013 |

OTHER PUBLICATIONS

Written Opinion for PCT/US2014/066758 dated Mar. 12, 2015; 3 pps.

* cited by examiner

FIG. 7E
LOGGED IN
ELIGIBLE FOR COMMUNITY SHARE
OTHER PLAYERS HAVE KEYS IN PLAY
720e
722e
728e
724e
726e
Cashier
$10,000.00

FIG. 7H
LOGGED IN
ELIGIBLE FOR COMMUNITY SHARE
CURRENT PLAYER WON A KEY
720h
722h
728h
724h
726h
Cashier
$10,000.00

SYSTEMS AND METHODS FOR SITE-WIDE JACKPOTS

CROSS-REFERENCE TO RELATED APPLICATIONS

The present application claims benefit and priority to, and is a non-provisional of, U.S. Provisional Patent Application No. 61/906,997 filed on Nov. 21, 2013 and titled "SYSTEMS AND METHODS FOR SITE-WIDE JACKPOTS", the entirety of such application hereby being incorporated by reference herein.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

Social and/or wagering games of various types such as online, skill-based, games of chance, and games of mixed skill and chance are a continued source of entertainment to game players, and are often a source of great revenue for gaming companies. One feature that is desirable in wagering games is a shared jackpot event available to certain groups of players (or more typically, certain groups or "banks" of machines). Typical "progressive" and/or "community" jackpot events, however, are limited in functionality and are well-known enough that they often fail to illicit sufficient levels of excitement and/or engagement from players.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
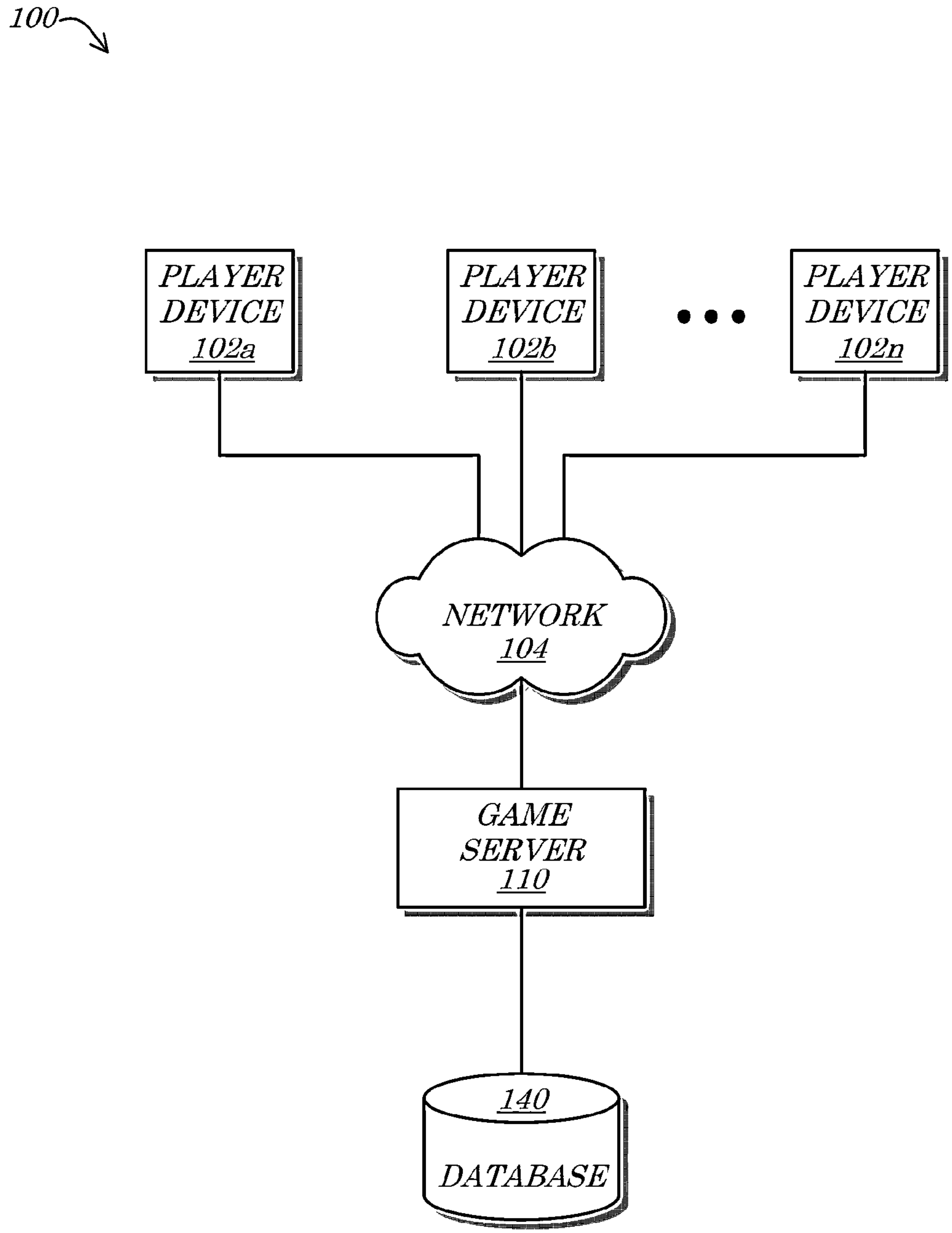
FIG. 1 is a block diagram of a system according to some embodiments.

Embodiments presented herein are descriptive of systems, apparatus, methods, and articles of manufacture for site-wide jackpots and/or community jackpots. In some embodiments, for example, a player of a primary wagering game may qualify to play a secondary game—such as a site-wide secondary game. According to some embodiments, the secondary game may comprise a lottery, other game of chance, game of skill, and/or game of mixed skill and chance. In some embodiments, the earning or winning of the chance to play the secondary game may be based on a probability. The probability may, for example, be based on a known or estimated house edge of the primary wagering game. In some embodiments, the player may choose whether or not and/or when to initiate and/or play the secondary game. According to some embodiments, upon a win in the secondary game, a secondary game jackpot may be awarded to the player and/or to one or more secondary players (e.g., a "community jackpot"). In some embodiments, the awarding of the secondary game jackpot may be conducted based on one or more player eligibility requirements and/or activity windows or thresholds. The secondary game jackpot may be split or divided between a plurality of players, for example, based on individual player activity in the primary game(s), e.g., during a jackpot eligibility window (that initiates before or after the winning of the secondary game jackpot by the winning player).

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

A "game", as the term is utilized herein (unless otherwise specified), may generally comprise any game (e.g., wagering or non-wagering, skill-based, chance-based, playable by hand (e.g., utilizing non-electric physical components, boards, and/or pieces), and/or electronically playable over a network) playable by one or more players in accordance with specified rules. An electronic game may be playable on a Personal Computer (PC), online in web browsers, on a game console, and/or on a mobile device such as a smartphone or tablet computer. "Gaming" thus generally refers to play of a game (e.g., by one or more players).

A "slot-style game", as the term is utilized herein (unless otherwise specified), generally refers to a game comprising one or more physical and/or virtual (e.g., simulated) slot reels and/or positions. While physical and/or simulated reels may "spin" or cycle through a plurality of possible outcomes before landing or stopping on specific symbols representing an outcome of an instance of the game, other electronic slot-style games may comprise a matrix of outcome positions that are filled or populated with symbols representing an outcome of the instance of the game (e.g., typically referred to as "cascading" or "tumbling reel" slots). Slot reel outcomes may be populated randomly or pseudo-randomly or may be predetermined (and/or determined based on a predetermined and/or desired result) and made to appear random. Slot-style games are typically games of chance and may comprise "casual games", "social network games", and/or "wagering games".

A "casual game", as the term is utilized herein (unless otherwise specified), may generally comprise a game with simple rules with little or no time commitment on the time of a player to play. A casual game may feature, for example, very simple game play such as a puzzle or Scrabbler™ game, may allow for short bursts of play (e.g., during work breaks), an ability to quickly reach a final stage and/or continuous play without a need to save the game.

A "social network game", as utilized herein (unless otherwise specified), generally refers to a type of online game that is played through a social network, and in some embodiments may feature multiplayer and/or asynchronous game play mechanics. A "social network" may refer to an online service, online community, platform, and/or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a web browser and/or web-client game, a Flash®, or Java®-scripted game, and/or may be implemented on one or more mobile platforms such as on portable electronic devices.

A "wagering game", as the term is utilized herein (unless otherwise specified), may generally comprise a game in which a player can risk a wager or other consideration, such as, but not limited to: slot-style games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as utilized herein (unless otherwise specified), generally refers to an entity or system of components which provides games for play and facilitates play of such game by use of a network such as the Internet or a proprietary or closed networks (e.g., an intranet or local or wide area network). For example, a game provider may operate a website which provides games in a digital format over the Internet. In some embodiments in which a game comprising a wagering game is provided, a game provider may operate a gambling website over which wagers are accepted and results (e.g., winnings) of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As utilized herein, a "player device" is a subset of a "network device". The "network device", for example, may generally refer to any device that can communicate via a network, while the "player device" may comprise a network device that is owned and/or operated by or otherwise associated with a player (e.g., a network device specifically configured to permit use thereof by the player, such as by receiving login credentials from the player). Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components. In some embodiments, a player device may comprise an electronic device configured to initiate, conduct, facilitate, and/or otherwise permit player participation in an electronic game.

As utilized herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As utilized herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As utilized herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as utilized herein (unless otherwise specified), may generally refer to any indicia and/or other information indicative of or associated with a subject, item, entity, and/or other object and/or idea. As utilized herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is utilized herein (unless otherwise specified), may generally comprise a period of time spanning a plurality of event instances (e.g., with respect to a communication and/or game session) or turns of a game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As utilized herein, the terms "outcome" and "result" should be differentiated in the present description in that an "outcome" is generally a representation of a "result", typically comprising one or more game elements or game symbols. For example, in a "fruit themed" slot-style game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As utilized herein, the term "site-wide jackpot" is meant to be descriptive of a type of award or prize provided to a plurality of online players. In some embodiments, "site-wide" may generally refer to a number of players that are (i) registered with a gaming system/entity and/or (ii) are playing (or have played) at a particular point (or window) in time. According to some embodiments, a "community jackpot" may be a particular type of site-wide jackpot wherein the group of players is more closely related with respect to some feature or metric. A "community" of players may comprise, for example, all players of a particular type or instance of game, a group of 'friends', and/or players that otherwise have a subset of metrics and/or characteristics in common. In some embodiments, site-wide and/or community jackpots as described herein are specifically not "progressive jackpots". In other words, site-wide and/or community jackpots may comprise and/or be paid from monies (or other items of value) that are not directly related to or based on wagers from wagering games.

As utilized herein, the term "virtual currency" may generally refer to an in-game currency that may be utilized as part of a game or one or more games provided by a game provider as (i) currency for making wagers, and/or (ii) to purchase or access various in-game items, features or powers (e.g., "freemium" upgrades and/or options).

A "credit balance", as the term is utilized herein (unless otherwise specified), may generally refer to (i) a balance of currency, whether virtual currency and/or real currency, usable for making wagers and/or purchases in a game and/or (ii) another tracking mechanism for tracking a player's success or advancement in a game by deducting there from points or value for unsuccessful attempts at advancement and adding thereto points or value for successful attempts at advancement.

Some embodiments are descriptive of an "array" or "matrix" of symbols or game outcomes. As utilized herein, the terms "array" and "matrix" generally refer to a group of symbols, numbers, and/or expressions arranged in a plurality of rows and columns (or that can be readily and appropriately represented mathematically as being so arranged). In some embodiments, the term "array" is utilized to refer to a multi-dimensional matrix or combination of matrices while the term "matrix" is utilized to refer to a two-dimensional set of symbols or numbers (e.g., slot reel symbols and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

III. Systems

Turning first to FIG. 1, a block diagram of a system 100 according to some embodiments is shown. In some embodiments, the system 100 may comprise a gaming platform such as a gaming platform via which one or more multiplayer and/or online games may be played (e.g., one or more slot-style, poker, bingo, and/or other wagering games). In some embodiments, the system 100 may comprise a plurality of player devices 102*a-n* in communication with and/or via a network 104. In some embodiments, a game server 110 may be in communication with the network 104 and/or one or more of the player devices 102*a-n*. In some embodiments, the game server 110 (and/or the player devices 102*a-n*) may be in communication with a database 140. The database 140 may store, for example, game date (e.g., processed and/or defined by the game server 110), data associated with players (not explicitly shown) owning and/or operating the player devices 102*a-n*, and/or instructions that cause various devices (e.g., the game server 110 and/or the player devices 102*a-n*) to operate in accordance with embodiments described herein.

According to some embodiments, any or all of the components 102*a-n*, 104, 110, 140 of the system 100 may be similar in configuration and/or functionality to any similarly named and/or numbered components described herein.

Fewer or more components 102*a-n*, 104, 110, 140 (and/or portions thereof) and/or various configurations of the components 102*a-n*, 104, 110, 140 may be included in the system 100 without deviating from the scope of embodiments described herein. While multiple instances of some components 102*a-n* are depicted and while single instances of other components 104, 110, 140 are depicted, for example, any component 102*a-n*, 104, 110, 140 depicted in the system 100 may comprise a single device, a combination of devices and/or components 102*a-n*, 104, 110, 140, and/or a plurality of devices, as is or becomes desirable and/or practicable. Similarly, in some embodiments, one or more of the various components 102*a-n*, 104, 110, 140 may not be needed and/or desired in the system 100.

The player devices 102*a-n*, in some embodiments, may comprise any type or configuration of electronic, mobile electronic, and or other network and/or communication devices (or combinations thereof) that are or become known or practicable. A first player device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102*a-n* may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102*a-n*, the game server 110, and/or the database 140. In some embodiments, the network 104 may comprise direct communications links between any or all of the components 102*a-n*, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102*b* may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 140 of the system 100. The network 104 may comprise one or more cellular telephone networks with communication links between the player devices 102*a-n* and the game server 110, for example, and/or may comprise the Internet, with communication links between the player devices 102*a-n* and the database 140, for example.

According to some embodiments, the game server 110 may comprise a device (and/or system) owned and/or operated by or on behalf of or for the benefit of a game provider (not explicitly shown). The game provider may utilize player and/or game information or instructions (e.g., stored by the database 140), in some embodiments, to host, manage, analyze, design, define, price, conduct, and/or otherwise provide (or cause to be provided) one or more games such as online multiplayer games (e.g., including site-wide and/or community jackpots as described herein). In some embodiments, the game provider (and/or a third-party; not explicitly shown) may provide an interface (not shown in FIG. 1; e.g., the example interfaces 720*a-j*, 820 of FIG. 7A, FIG. 7B, FIG. 7C, FIG. 7D, FIG. 7E, FIG. 7F, FIG. 7G, FIG. 7H, FIG. 7I, FIG. 7J, and/or FIG. 8 herein) to and/or via the player devices 102*a-n*. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may cause and/or facilitate various functionality and/or features of one or more games and/or payouts or jackpots thereof, described herein.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

According to some embodiments, any or all of the player devices 102*a-n* in conjunction with one or more of the game server 110 and/or the database 140 (e.g., via the network 104) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 2:
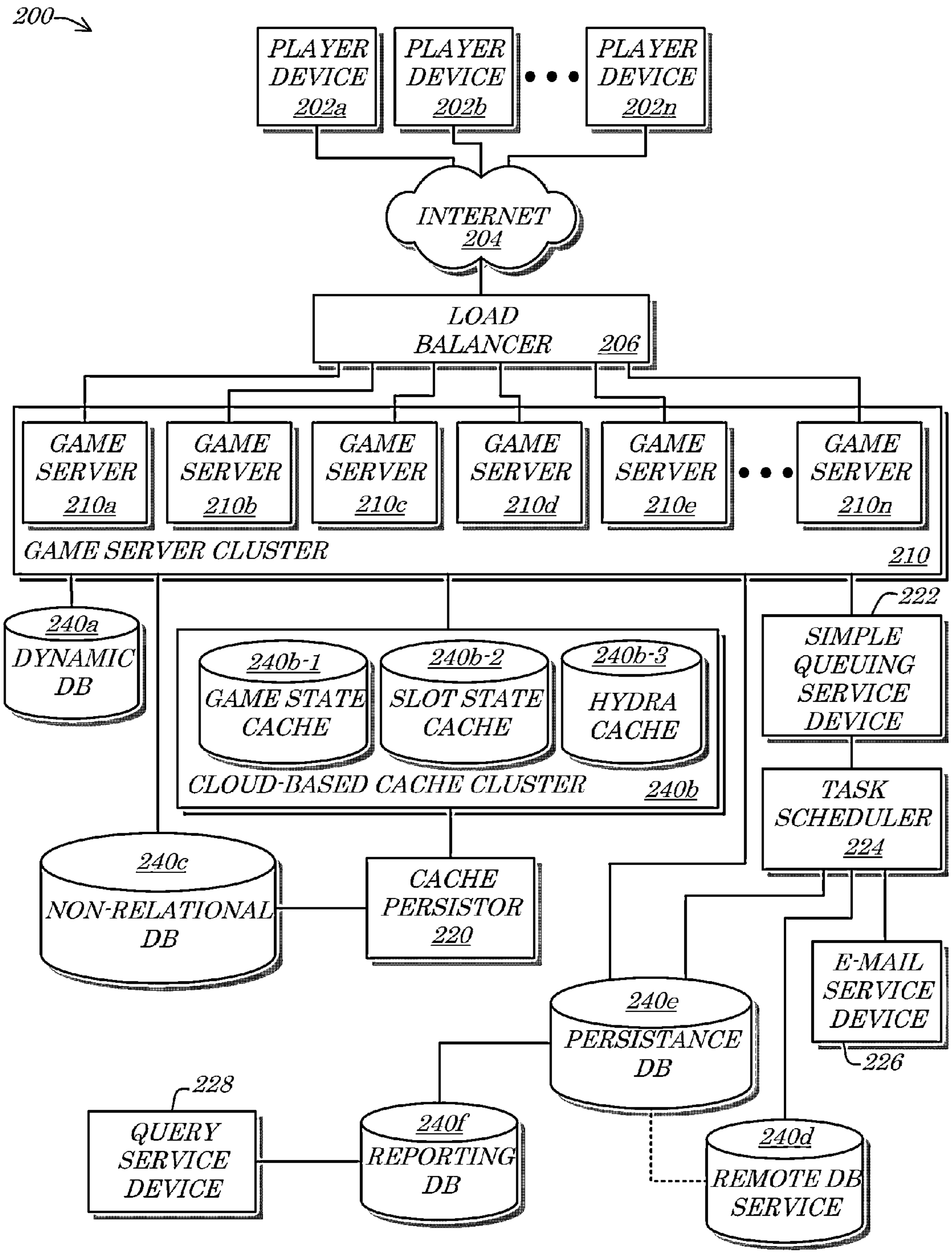
FIG. 2 is a block diagram of a system according to some embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., having one or more site-wide and/or community jackpots as described herein). In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slot-style games, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., slot-style games) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

According to some embodiments, any or all of the player devices 202*a-n* in conjunction with one or more of the game servers 210*a-n* and/or the databases 240*a-f* (e.g., via the network 204) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 3:
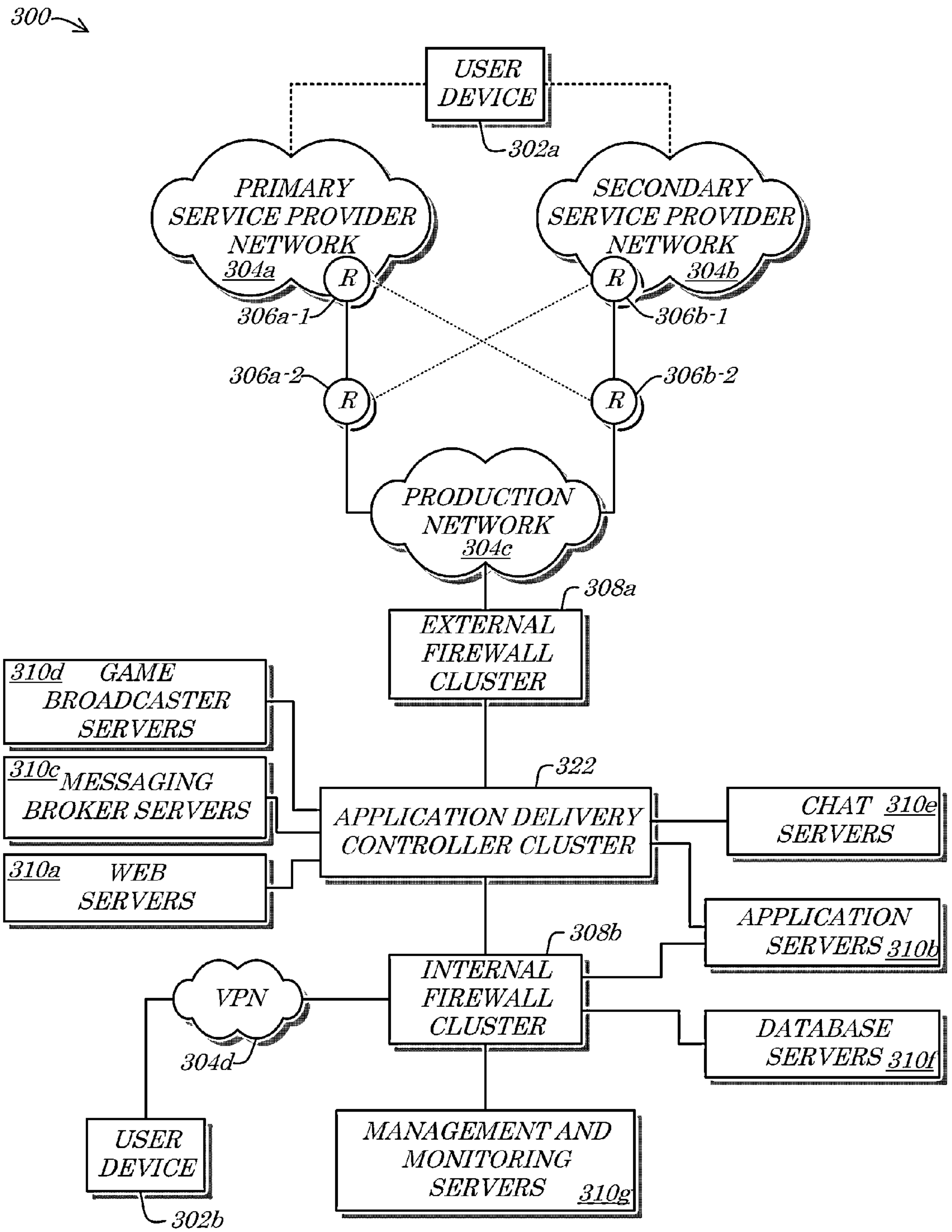
FIG. 3 is a block diagram of a system according to some embodiments.

Turning now to FIG. 3, a block diagram of a system 300 according to some embodiments is shown. In some embodiments, the system 300 may comprise and/or define a "front-end" architecture of a gaming platform such as a platform via which wagering, social, multiplayer, and/or online games may be played (e.g., having one or more site-wide and/or community jackpots as described herein). In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 302*a*. The first user device 302*a* may, for example, submit a call for an online gaming interface (e.g., the example interfaces 720*a-j*, 820 of FIG. 7A, FIG. 7B, FIG. 7C, FIG. 7D, FIG. 7E, FIG. 7F, FIG. 7G, FIG. 7H, FIG. 7I, FIG. 7J, and/or FIG. 8 herein) to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a-g*. In the case that the first user device 302*a* is utilized to access an online gaming interface (not explicitly shown; e.g., the example interfaces 720*a-j*, 820 of FIG. 7A, FIG. 7B, FIG. 7C, FIG. 7D, FIG. 7E, FIG. 7F, FIG. 7G, FIG. 7H, FIG. 7I, FIG. 7J, and/or FIG. 8 herein) for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 302*a* (and/or from one or more of the other servers 310*a-b*, 310*d*-g) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302*a* (e.g., facilitating a decoupling of services provided by various applications on and/or from the various servers 310*a-b*, 310*d-g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 302*a* (e.g., in connection with the play of an online bingo, slots, and/or other game for which broadcast information may be utilized). In some embodiments, the chat servers 310*e* may provide, manage, and/or facilitate communications between the first user device 302*a* (and/or first user thereof) and one or more other player/user devices (such as a second user device 302*b* and/or other player/user devices not shown in FIG. 3).

According to some embodiments, the second user device 302*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online game provider may, for example, utilize the second user device 302*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 302*b* may, for example, be required to provide credentials to and/or otherwise access the application delivery controller cluster 322 and/or servers 310*a-g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 302*b*. The second user device 302*b* may, for example, access the management and monitoring servers 310*g* and/or the database servers 310*f* to run reports descriptive of online gaming operations, game play, and/or game referral setup, management, and/or analysis. According to some embodiments, either or both of the user devices 302*a-b* in conjunction with one or more of the servers 310*a-g* and/or the application delivery controller cluster 322 may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Utilization of the term “server” with respect to the servers 310*a-g* of the system 300 of FIG. 3 is meant solely to ease description of the configuration and/or functionality of the servers 310*a-g*. The term “server” is not intended to be limiting with respect to any particular hardware, software, firmware, and/or quantities thereof utilized to implement any or all of the servers 310*a-g* of the system 300. Similarly, while multiple types and/or instances of the severs 310*a-g* are depicted in FIG. 3, any or all of the servers 310*a-g* may be implemented in, on, and/or by one or multiple computer server and/or other electronic devices.

Figure 4:
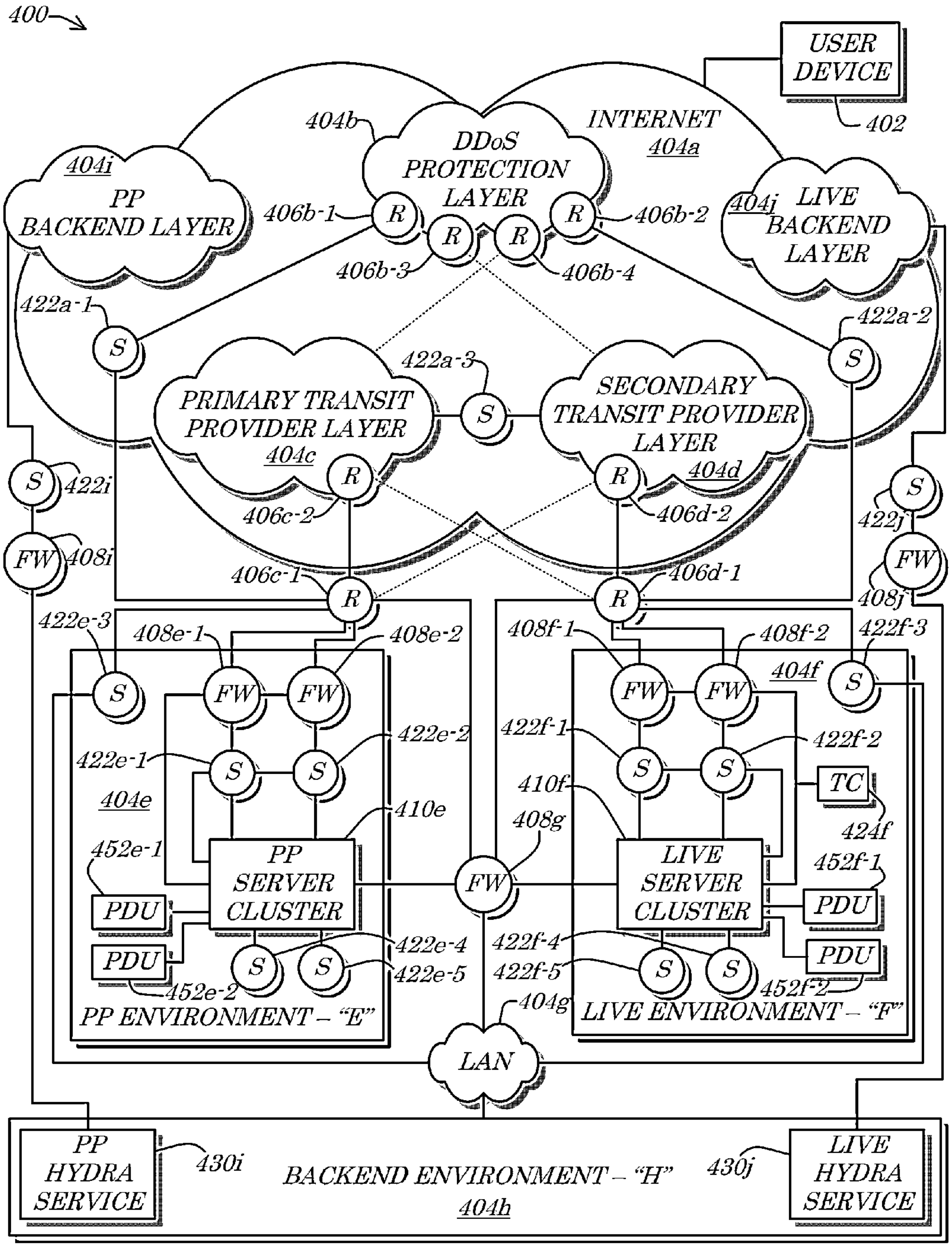
FIG. 4 is a block diagram of a system according to some embodiments.

Referring now to FIG. 4, a block diagram of a system 400 according to some embodiments is shown. In some embodiments, the system 400 may comprise and/or define a “front-end” architecture of a gaming platform such as a platform via which wagering, social, multiplayer, and/or online games may be played (e.g., having one or more site-wide and/or community jackpots as described herein). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404*a-j* (e.g., the Internet 404*a*, a Distributed Denial-of-Service (DDoS) protection layer 404*b*, a primary transit provider layer 404*c*, a secondary transit provider layer 404*d*, a Pre-Production (PP) environment 404*e*, a live environment 404*f*, a LAN 404*g*, a backend environment 404*h*, a PP backend layer 404*i*, and/or a live backend layer 404*j*), a plurality of routers 406*b-d*, a plurality of firewall devices 408*e-g*, 408*i-j*, a plurality of servers 410*e-f* (e.g., a PP server cluster 410*e* and/or a live server cluster 410*f*), a plurality of switching devices 422*a*, 422*e-f*, 422*i-j*, a Terminal Concentrator (TC) 424*f*, a plurality of "hydra" services 430*i-j* (e.g., a PP hydra service 430*i* and/or a live hydra service 430*j*), and/or a plurality of Power Distribution Unit (PDU) devices 452*e-f*.

According to some embodiments, any or all of the components 402, 404*a-j*, 406*b-d*, 408*e-g*, 408*i-j*, 410*e-f*, 422*a*, 422*e-f*, 422*i-j*, 424*f*, 430*i-j*, 452*e-f* of the system 400 may be similar in configuration and/or functionality to any similarly named and/or numbered components described herein. Fewer or more components 402, 404*a-j*, 406*b-d*, 408*e-g*, 408*i-j*, 410*e-f*, 422*a*, 422*e-f*, 422*i-j*, 424*f*, 430*i-j*, 452*e-f* (and/or portions thereof) and/or various configurations of the components 402, 404*a-j*, 406*b-d*, 408*e-g*, 408*i-j*, 410*e-f*, 422*a*, 422*e-f*, 422*i-j*, 424*f*, 430*i-j*, 452*e-f* may be included in the system 400 without deviating from the scope of embodiments described herein. While multiple instances of some components 404*a-j*, 406*b-d*, 408*e-g*, 408*i-j*, 410*e-f*, 422*a*, 422*e-f*, 422*i-j*, 430*i-j*, 452*e-f* are depicted and while single instances of other components 402, 424*f* are depicted, for example, any component 402, 404*a-j*, 406*b-d*, 408*e-g*, 408*i-j*, 410*e-f*, 422*a*, 422*e-f*, 422*i-j*, 424*f*, 430*i-j*, 452*e-f* depicted in the system 400 may comprise a single device, a combination of devices and/or components 402, 404*a-j*, 406*b-d*, 408*e-g*, 408*i-j*, 410*e-f*, 422*a*, 422*e-f*, 422*i-j*, 424*f*, 430*i-j*, 452*e-f*, and/or a plurality of devices, as is or becomes desirable and/or practicable. Similarly, in some embodiments, one or more of the various components 402, 404*a-j*, 406*b-d*, 408*e-g*, 408*i-j*, 410*e-f*, 422*a*, 422*e-f*, 422*i-j*, 424*f*, 430*i-j*, 452*e-f* may not be needed and/or desired in the system 400.

In some embodiments, the user device 402 may be utilized to access one or more of the PP environment 404*e*, the live environment 404*f*, and/or the backend environment 404*h* via the Internet 404*a*. In some embodiments, the user device 402 may be utilized to access the backend environment 404*h* and/or the PP hydra service 430*i* via the PP backend layer 404*i*. A PP backend switch device 422*i* and/or a PP backend firewall device 408*i* may, for example, gate and/or control access to the backend environment 404*h* and/or the PP hydra service 430*i*, via the PP backend layer 404*i*. In some embodiments, the user device 402 may be utilized to access the backend environment 404*h* and/or the live hydra service 430*j* via the live backend layer 404*j*. A live backend switch device 422*j* and/or a live backend firewall device 408*j* may, for example, gate and/or control access to the backend environment 404*h* and/or the live hydra service 430*j*, via the live backend layer 404*j*.

According to some embodiments, any communications (e.g., requests, calls, and/or messages) from the user device 402 may be passed through the DDoS protection layer 404*b*. The DDoS protection layer 404*b* may, for example, monitor and/or facilitate protection against various forms of cyber attacks including, but not limited to, DDoS attacks. In some embodiments, the DDoS protection layer 404*b* may comprise and/or be in communication with a plurality of DDoS router devices 406*b*-1, 406*b*-2, 406*b*-3, 406*b*-4 that may be utilized to route and/or direct incoming communications (e.g., from the user device 402) to appropriate portions of the system 400.

In some embodiments, the DDoS protection layer 404*b* and/or a first DDoS router device 406*b*-1 may route communications from the user device 402 through and/or via a first switch device 422*a*-1 and/or to, through, and/or via a first primary transit provider router device 406*c*-1. In some embodiments, the first switch device 422*a*-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406*c*-1 may, for example, provide access to the PP environment 404*e* and/or the PP server cluster 410*e* thereof, such as via one or more PP firewall devices 408*e*-1, 408*e*-2 and/or one or more PP switch devices 422*e*-1, 422*e*-2. According to some embodiments, the PP switch devices 422*e*-1, 422*e*-2 may comprise content switching devices that process and route data (e.g., in the data link layer) based on data content. In some embodiments, the first primary transit provider router device 406*c*-1 may direct communications to, through, and/or via a PP LAN switch device 422*e*-3 that provides and/or facilitates access to the LAN 404*g*. The LAN 404*g* may, for example, provide private access to and/or between the PP environment 404*e*, the live environment 404*f*, and/or the backend environment 404*h*. In some embodiments, the first primary transit provider router device 406*c*-1 and/or the PP LAN switch device 422*e*-3 may direct communications to, through, and/or via a LAN firewall device 408*g* that provides direct access to either or both of the PP server cluster 410*e* and the live server cluster 410*f*.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410*f* (e.g., via the Internet 404*a*) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 5:
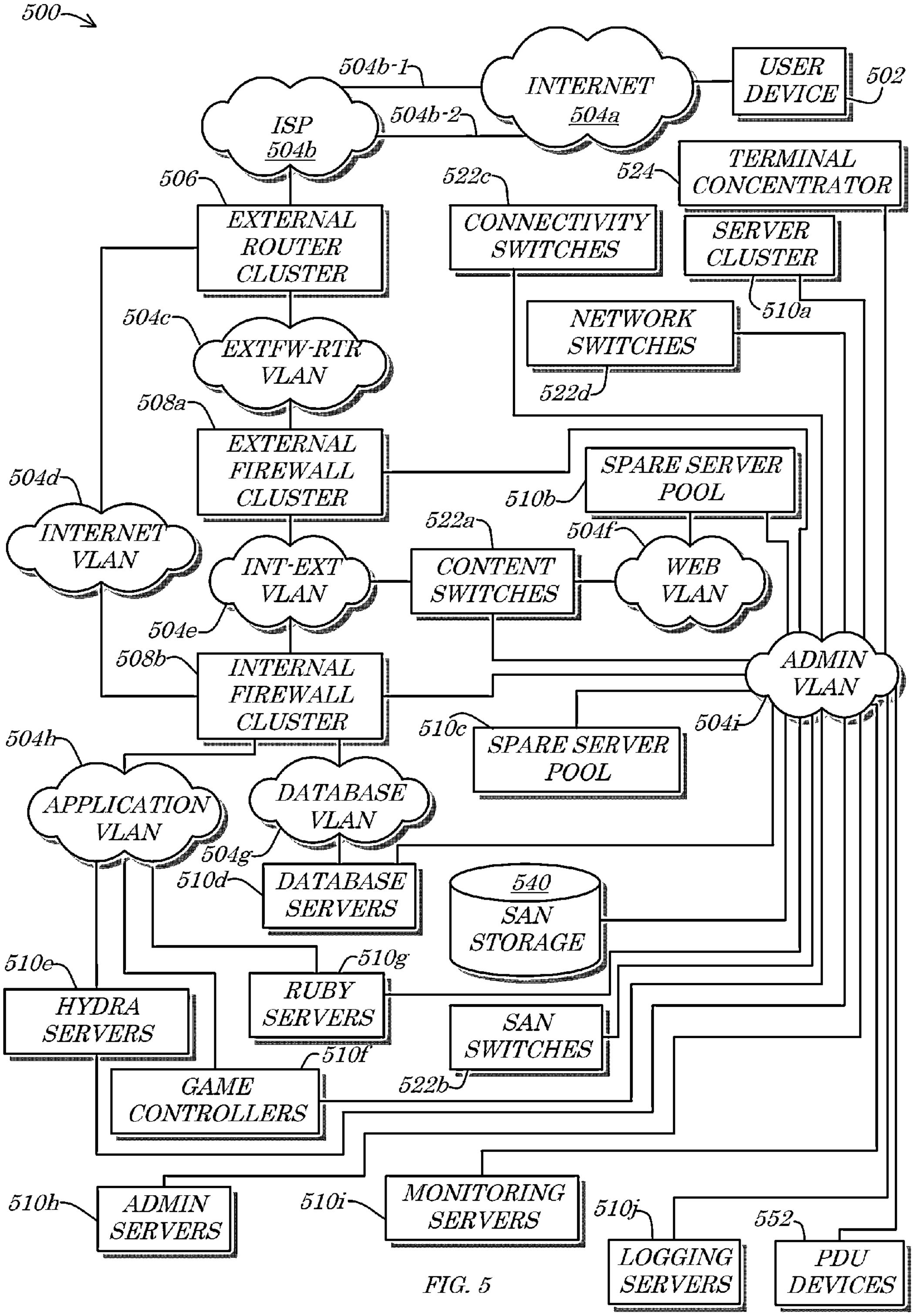
FIG. 5 is a block diagram of a system according to some embodiments.

Turning to FIG. 5, a block diagram of a system 500 according to some embodiments is shown. In some embodiments, the system 500 may comprise and/or define a "back-end" architecture of a gaming platform such as a platform via which wagering, social, multiplayer, and/or online games may be played (e.g., having one or more site-wide and/or community jackpots as described herein). The system 500 may be utilized in conjunction with the systems 300, 400 if FIG. 3 and/or FIG. 4 herein, for example, and/or may be similar in configuration and/or functionality to the back-end environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a-l*, 506, 508*a-b*, 510*a-j*, 522*a-d*, 524, 540, 552 of the system 500 may be similar in configuration and/or functionality to any similarly named and/or numbered components described herein. Fewer or more components 502, 504*a-l*, 506, 508*a-b*, 510*a-j*, 522*a-d*, 524, 540, 552 (and/or portions thereof) and/or various configurations of the components 502, 504*a-l*, 506, 508*a-b*, 510*a-j*, 522*a-d*, 524, 540, 552 may be included in the system 500 without deviating from the scope of embodiments described herein. While multiple instances of some components 504*a-l*, 508*a-b*, 510*a-j*, 522*a-d* are depicted and while single instances of other components 502, 506, 524, 540, 552 are depicted, for example, any component 502, 504*a-l*, 506, 508*a-b*, 510*a-j*, 522*a-d*, 524, 540, 552 depicted in the system 500 may comprise a single device, a combination of devices and/or components 502, 504*a-l*, 506, 508*a-b*, 510*a-j*, 522*a-d*, 524, 540, 552, and/or a plurality of devices, as is or becomes desirable and/or practicable. Similarly, in some embodiments, one or more of the various components 502, 504*a-l*, 506, 508*a-b*, 510*a-j*, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of a game provider and/or other entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches

522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f.*

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a* j, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j.*

In some embodiments, the server cluster 510*a* may comprise one or more servers and/or other electronic controller devices (e.g., blade servers) configured to provide online gaming data (e.g., interfaces, outcomes, and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

According to some embodiments, the user device 502 in conjunction with one or more of the servers 510*a-j* (e.g., via the Internet 504*a*) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

IV. Methods

Figure 6:
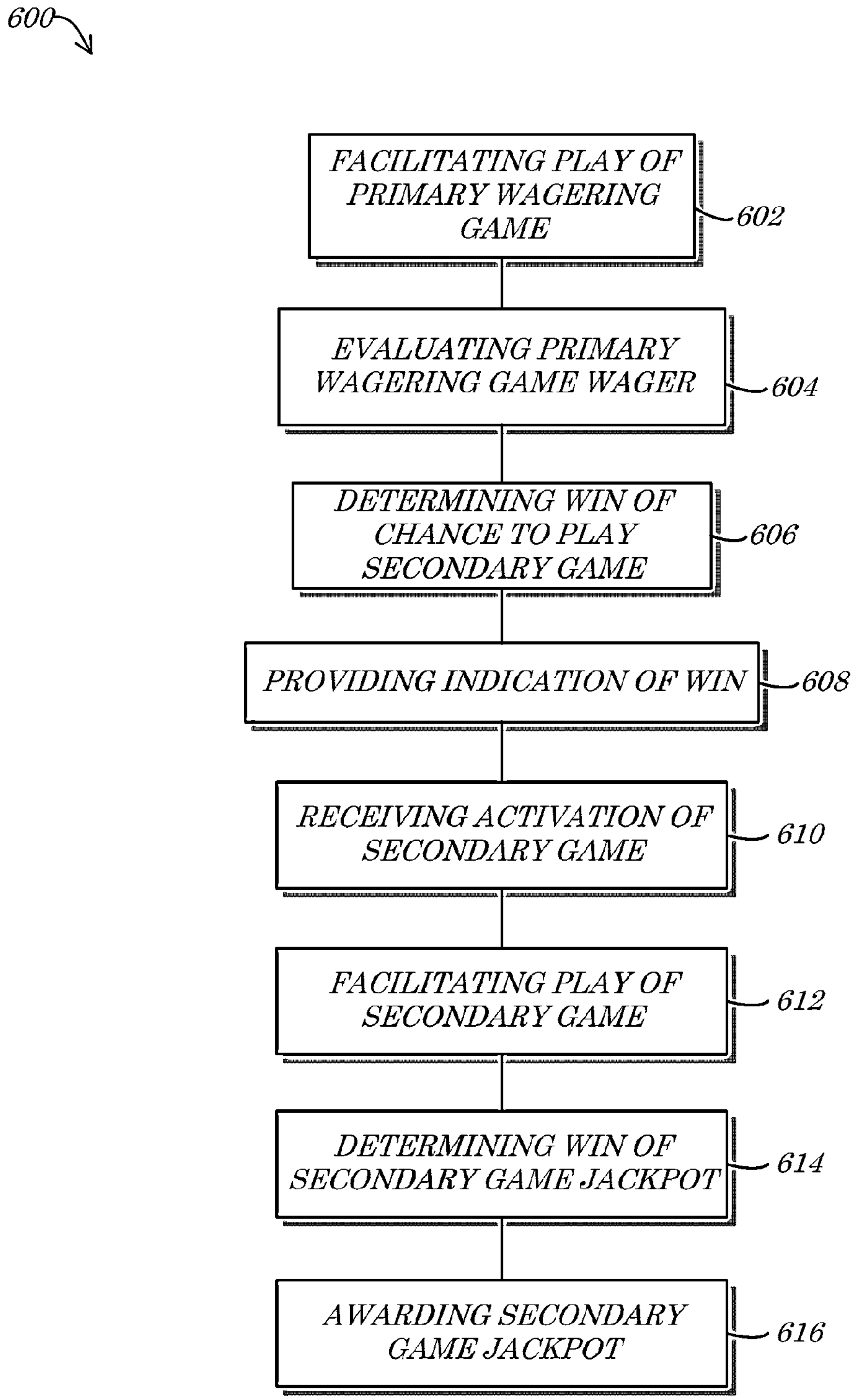
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or computerized processing devices (e.g., the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein), specialized computers, computer terminals, computer servers, computer systems and/or networks, and/or any combinations thereof (e.g., by one or more online game providers and/or online gaming player processing devices). In some embodiments, the method 600 may be embodied in, facilitated by, and/or otherwise associated with various input mechanisms and/or interfaces (e.g., the example interfaces 720*a-j*, 820 of FIG. 7A, FIG. 7B, FIG. 7C, FIG. 7D, FIG. 7E, FIG. 7F, FIG. 7G, FIG. 7H, FIG. 7I, FIG. 7J, and/or FIG. 8 herein).

The process and/or flow diagrams described herein do not necessarily imply a fixed order to any depicted actions, steps, and/or procedures, and embodiments may generally be performed in any order that is practicable unless otherwise and specifically noted. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the method 600 may comprise facilitating (e.g., by a processing device) play of a primary wagering game, at 602. The method 600 may comprise, for example, facilitating, by a processing device, gameplay of a primary wagering game conducted via a first gaming device of a first player, the primary wagering game being conducted in accordance with first stored rules defining one or more probabilities of winning one or more primary wagering game payouts. In some embodiments, the primary game may comprise a wagering game such as a slot-style, poker, bingo, and/or other wagering game variant offered for play via a website, network, and/or via a server, client and/or gaming application and/or device, and/or any combination thereof.

According to some embodiments, the method 600 may comprise evaluating (e.g., by the processing device) a wager of the primary wagering game, at 604. Some embodiments may comprise, for example, evaluating, by the processing device and based on a probability of the first player winning a chance to play a secondary game, a wager made by the first player in the primary wagering game. According to some embodiments, each wager in the primary game may trigger an evaluation of a probability of an entry into the secondary game being achieved. According to some embodiments, the probability may be based on a type and/or characteristic of the primary game such as a house edge of the primary wagering game. The method 600 may comprise, for example, determining, by the processing device and based on a type of wagering game of the primary wagering game, the probability of the first player winning the chance to play the secondary game. The higher the house edge for a particular game type, for example, the more likely it may be (i.e., the higher the probability may be set) that a player of the primary wagering game achieves or wins a chance to play the secondary game. According to some embodiments, the evaluation may comprise operation of a Random Number Generator (RNG) or the like. In some embodiments, the probability of winning a chance may be defined by the following formula:

$$P_1=P_{gametype}, \quad (1)$$

where $P_1$ is the first probability (i.e., the probability of winning a chance to play the secondary game—e.g., the chance of winning a "key") and where $P_{gametype}$ is a fixed probability value based on the type (and/or other characteristic) of the primary wagering game (e.g., $P_{gametype}$=0.004 for slot-style games and/or $P_{gametype}$=0.0008 for other casino-style games).

In some embodiments, the method 600 may comprise determining (e.g., by the processing device) a win of a chance to play a secondary game, at 606. The method 600 may comprise, for example, determining, by the processing device and based on the evaluation of the wager, that the first player has won a chance to play the secondary game. The result of the evaluation may indicate, for example, that a result of an RNG and/or other random or pseudo-random determination meets or exceeds a predetermined win threshold for the secondary game entry.

According to some embodiments, the method 600 may comprise providing (e.g., by the processing device) an indication of the win, at 608. The method 600 may comprise, for example, providing, by the processing device and to the first gaming device of the first player, an indication of the winning of the chance to play the secondary game. In some embodiments, the indication may comprise a particular graphical element that appears, becomes animated, and/or is otherwise highlighted on a Graphical User Interface (GUI) presented to the player (e.g., the example interfaces 720*a-j*, 820 of FIG. 7A, FIG. 7B, FIG. 7C, FIG. 7D, FIG. 7E, FIG. 7F, FIG. 7G, FIG. 7H, FIG. 7I, FIG. 7J, and/or FIG. 8 herein). According to some embodiments, the interface indication may comprise an image or button or other feature represented as a key—e.g., that "unlocks" the secondary game for entry.

In some embodiments, the method 600 may comprise receiving (e.g., by the processing device and/or in response to the providing) an activation of the secondary game, at 610. The method 600 may comprise, for example, receiving, by the processing device, in response to the providing and from the first player device, an indication that the first player desires to activate the chance to play the secondary game. In some embodiments, such as in the case that the graphical element (e.g., the 'key') from 608 is presented to the player upon achievement of the secondary game entry, the player may click-on, press, and/or otherwise activate or interact with the feature to indicate a desire to enter the secondary game (and/or initiate play thereof).

According to some embodiments, the method 600 may comprise facilitating (e.g., by the processing device) play of the secondary game, at 612. The method 600 may comprise, for example, facilitating, by the processing device, gameplay of the secondary game conducted via the first gaming device of the first player, the secondary game being conducted in accordance with second stored rules defining a probability of winning a secondary game jackpot. In some embodiments, while the primary wagering game comprises a wagering game, the secondary game may comprise a non-wagering game. According to some embodiments, any payouts and/or jackpots from the secondary game may be established, sized, and/or determined or defined based on metrics that are unrelated or not directly related to the primary wagering game. Secondary game payouts and jackpots may, for example, be based on marketing dollars and/or other predefined and/or pre-established pools of funds—e.g., as opposed to being dynamically determined based on player wagers and/or wager contributions (i.e., secondary game jackpots may specifically exclude "progressive" jackpots). According to some embodiments, the secondary game may be a game of chance such as a sweepstakes or lottery, a game of skill such as an arcade-style or simulation game, and/or a combination thereof (i.e., a game of mixed skill and chance). According to some embodiments, the secondary game may specifically exclude wagering games—i.e., no separate or distinct wager may be placed with respect to the play of the secondary game, and while the original wager from the primary wagering game may have provided the opportunity to win the chance to play the secondary game, the wager itself and/or the magnitude thereof may have no bearing on the secondary game and/or jackpots or payouts thereof.

In some embodiments, the method 600 may comprise determining (e.g., by the processing device) a win of the secondary game, at 614. The method 600 may comprise, for example, determining, by the processing device, that the first player has won the secondary game jackpot. In some embodiments, the winning of the chance to play the secondary game may guarantee a winning outcome of the secondary game. In the case that the secondary game is a straight sweepstakes, for example, the winning of the chance based on the trigger of the underlying primary game wager may be equivalent to a win of the sweepstakes prize (or one or more of the prizes thereof, in the case of multiple possible prizes or instances of prizes). In some embodiments, the winning of the chance to play the secondary game may have no bearing on the result of the secondary game. The first probability defining whether the chance to play the secondary game may comprise a first value, for example, while a payout structure of the secondary game may be governed and/or defined by one or more other probabilities that are different than the first probability. In some embodiments, the probability of a play of the secondary game generating a win may be defined by the following formula:

$$P_2=\frac{B*H*10\%}{EP*P_1}, \quad (2)$$

where $P_2$ is the probability of a secondary game win (e.g., of the "key" opening the "jackpot" treasure chest), B is the bet size from the primary wagering game, H is the house edge of the primary wagering game, EP is the expected jackpot payout.

According to some embodiments, the method 600 may comprise awarding (e.g., by the processing device and/or in response to the determining of the win of the secondary game) a secondary game jackpot, at 616. The method 600 may comprise, for example, awarding, via the processing device, the secondary game jackpot. In some embodiments, the awarding may comprise a site-wide and/or community award. Players in addition to or even other than the first player may, for example, share in and/or obtain a portion of the jackpot. The method 600 may comprise, for example, determining, by the processing device, a plurality of players that qualify to share in the secondary game jackpot and awarding the secondary game jackpot to the first player and at least one second player of the plurality of players. In some embodiments, the determining of the plurality of players that qualify to share the secondary game jackpot may comprise determining that each player of the plurality of players satisfied a qualifying wager threshold during a secondary game jackpot qualification period. According to some embodiments, such a secondary game jackpot qualification period may initiate upon the determination that the first player has won the secondary game jackpot and conclude after a predetermined amount of time subsequent to the initiation. According to some embodiments, such a secondary game jackpot qualification period may conclude upon the determination that the first player has won the secondary game jackpot and initiate a predetermined amount of time prior to the determination of the win. In other words, the eligibility window for sharing in the site-wide and/or community jackpot (e.g., trigger by the first player) may determine which players share in the jackpot and/or to what extent they share in the jackpot. In some embodiments for example, a number or amount of wagers (and/or another metric of wagering activity) by all players (or players of a particular type or group) in a particular time window (e.g., five (5) minutes preceding the secondary game win) may be utilized to determine a weighted distribution of the site-wide and/or community jackpot (e.g., based on each player's respective wager count, sums, frequency, etc.). In some embodiments, such as in the case that the eligibility window is retroactive or historical, even players that are not currently playing or logged-in when the first player wins the secondary game may share in the jackpot. In some embodiments, the site-wide and/or community jackpot may be awarded and/or split or distributed in accordance with the following formula:

$$S_n=B*H*10\%, \qquad (3)$$

where $S_n$ is the share of the jackpot for the "$n^{th}$" player that qualifies for the jackpot.

V. Example Interfaces

Referring now to FIG. 7A, FIG. 7B, FIG. 7C, FIG. 7D, FIG. 7E, FIG. 7F, FIG. 7G, FIG. 7H, FIG. 7I, and FIG. 7J, example interfaces 720*a-j* according to some embodiments are shown. In some embodiments, the interfaces 720*a-j* may comprise one or more web pages, web forms, database entry forms, API objects, spreadsheets, tables, and/or applications (or portions or combinations thereof) or other GUI objects via which a player of an online game may qualify for, participate in, and/or win a secondary game such as a secondary game having a site-wide jackpot component as described herein. The interfaces 720*a-j* may, for example, comprise portions of a front-end of an online gaming program and/or platform programmed and/or otherwise configured to execute, conduct, and/or facilitate the method 600 of FIG. 6 herein, and/or portions thereof. In some embodiments, the interfaces 720*a-j* may be output via a computerized device such as one or more specialized and/or computerized processing devices (e.g., the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein), specialized computers, computer terminals, computer servers, computer systems and/or networks, and/or any combinations thereof (e.g., by one or more online game providers and/or online gaming player processing devices).

Figure 7A:
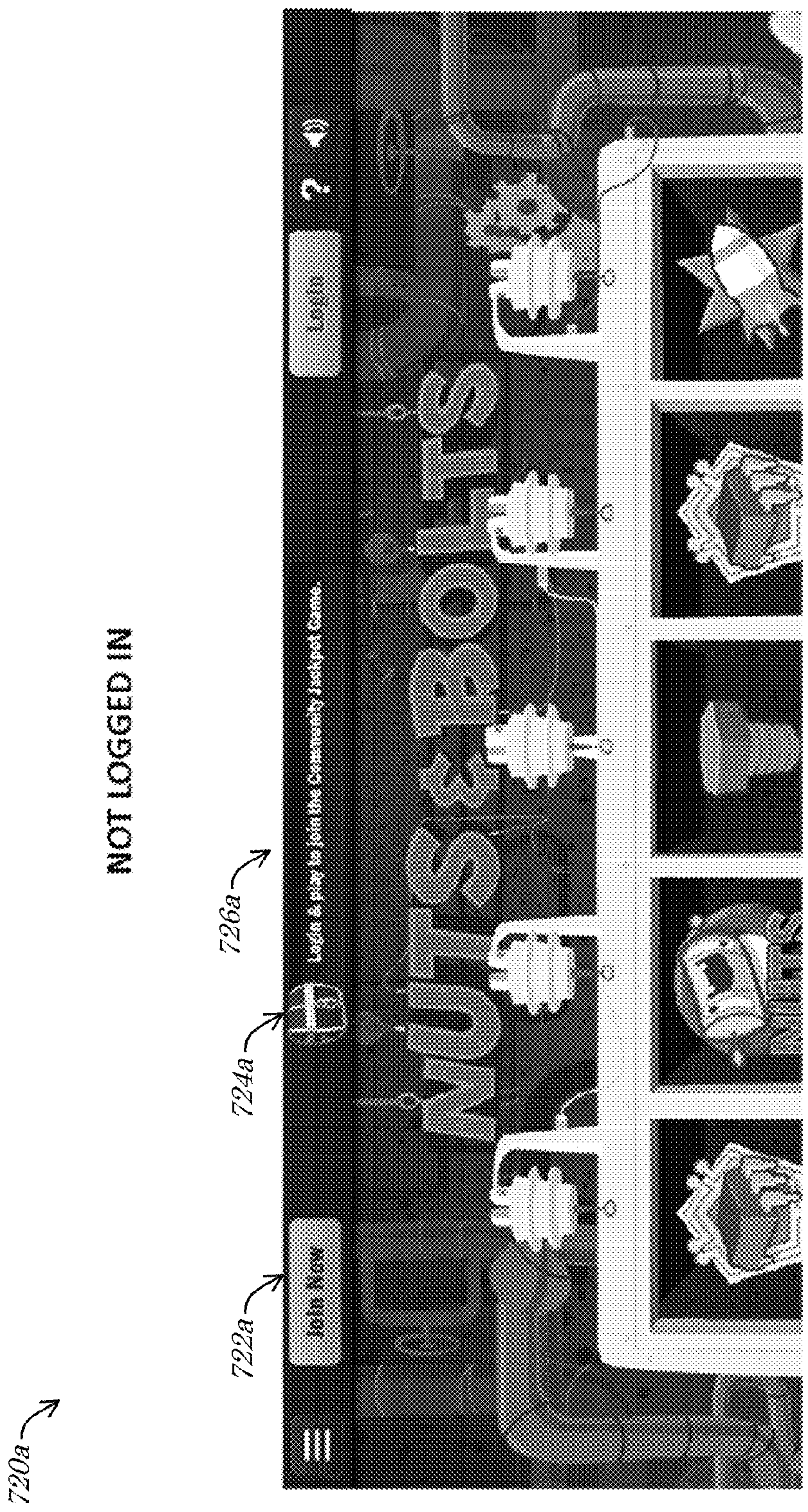
FIG. 7A, FIG. 7B, FIG. 7C, FIG. 7D, FIG. 7E, FIG. 7F, FIG. 7G, FIG. 7H, FIG. 7I, and FIG. 7J are example interfaces according to some embodiments.

According to some embodiments, a first example interface 720*a* depicted in FIG. 7A may comprise a screen display (e.g., screen output) that is provided and/or output to a player prior to the player having been identified and/or prior to the player having logged-in to a player account (e.g., an "anonymous" or "guest" player). The first example interface 720*a* may comprise, for example, a first action button 722*a* such as the depicted "Join Now" button, a first site-wide jackpot icon 724*a* such as the depicted locked treasure chest, and/or a first site-wide jackpot message 726*a* such as the depicted message prompting the player to login (e.g., interface with the first action button 722*a*) to qualify for and/or compete in the "Community Jackpot Game". According to some embodiments, the first example interface 720*a* may represent a portion of a full interface and/or output provided to a player as part of an online gaming experience. Portions of the first example interface 720*a* not fully depicted in FIG. 7A may, for example, be associated with play of a primary game such as a slot-style wagering game titled "Nuts & Bolts". Other primary games and/or game types may be implemented in the not-fully depicted portion of the first example interface 720*a* in various embodiments.

Figure 7B:
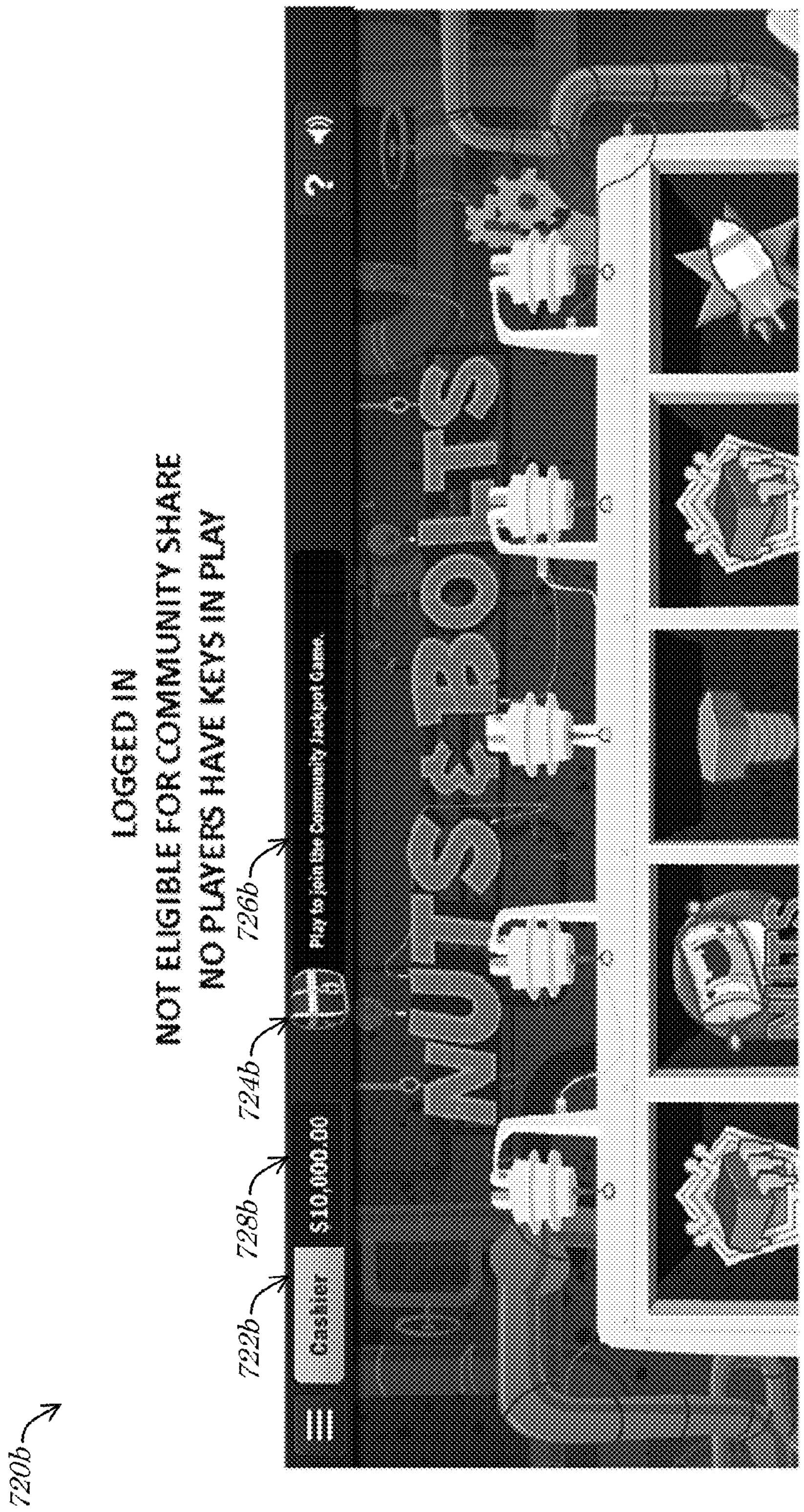

In some embodiments, a second example interface 720*b* depicted in FIG. 7B may comprise a screen display (e.g., screen output) that is provided and/or output to the player after the player has been identified and/or in response to the player having logged-in to a player account. An activation of and/or interaction of the player with the first action button 724*a*, for example, may cause and/or trigger an outputting of the second example interface 720*b*. In some embodiments, the second example interface 720*b* may comprise a second action button 722*b* such as the depicted "Cashier" button, a second site-wide jackpot icon 724*b* such as the depicted locked treasure chest, a second site-wide jackpot message 726*b* such as the depicted message prompting the player to initiate game play to qualify for and/or compete in the "Community Jackpot Game", and/or a first site-wide jackpot value display 728*b* that depicts the amount of available funds that may be won via the "Community Jackpot Game" (e.g., a secondary game). According to some embodiments, the second example interface 720*b* may depict a status of the secondary site-wide jackpot game in which no players of the "Community Jackpot Game" have yet (or currently are) qualified to play or win. In some embodiments, the logged-in player is required to place a wager (such as an "eligible" wager that meets some predetermined criteria and/or threshold requirement) during a "window of eligibility" that comprises a particular period of time. In the case that the "window of eligibility" comprises a rolling period of, for example, ten (10) minutes, the player may have made an eligible wager that at some point during the rolling progression of the "window of eligibility" has aged enough to disqualify the wager from the "window of eligibility".

Figure 7C:
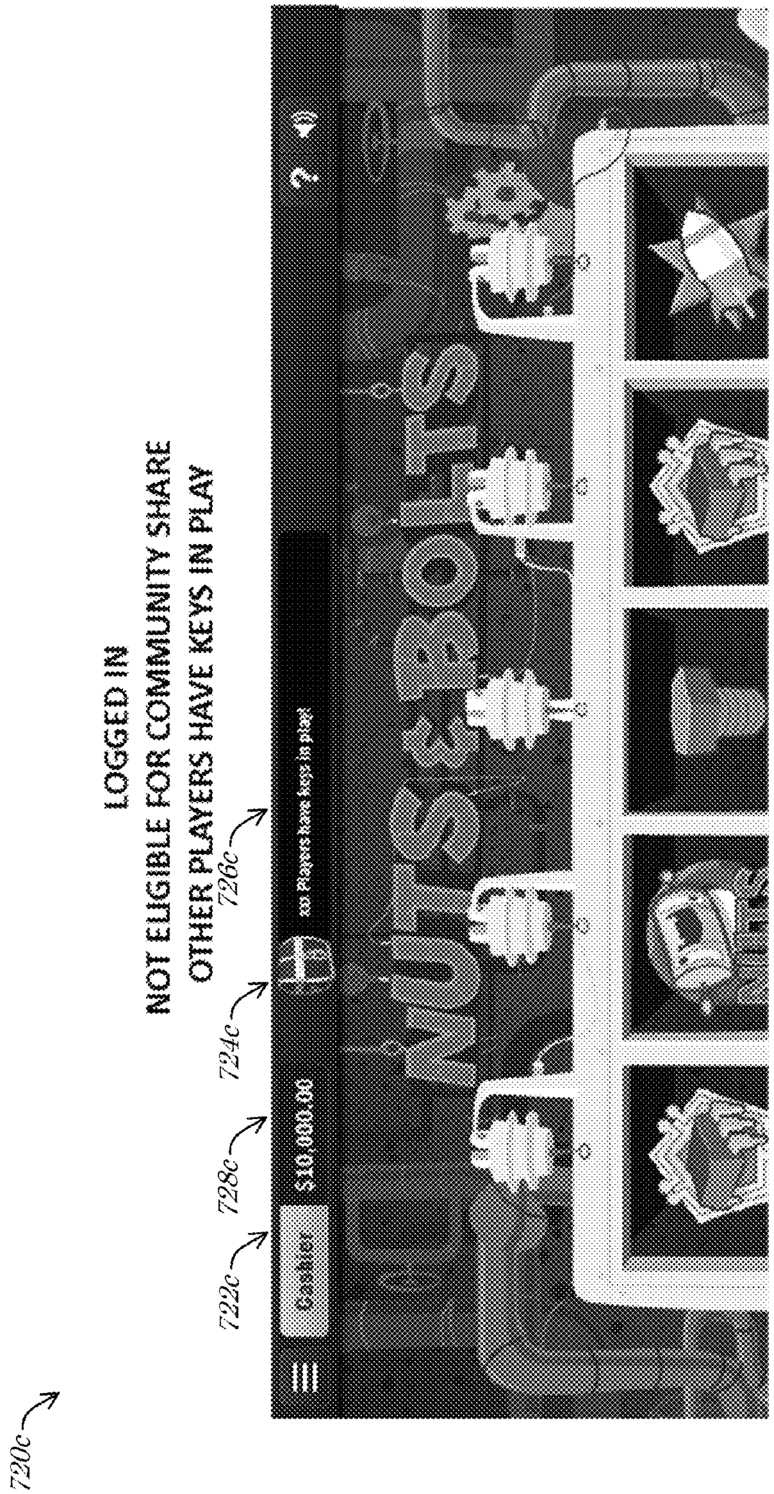

According to some embodiments, a third example interface 720*c* depicted in FIG. 7C may comprise a screen display (e.g., screen output) that is provided and/or output to the player once the status of the secondary site-wide jackpot game has changed such that one or more other players have qualified to play or win the "Community Jackpot Game". The third example interface 720*c* may comprise, for example, a third action button 722*c* such as the depicted "Cashier" button, a third site-wide jackpot icon 724*c* such as the depicted locked treasure chest, a third site-wide jackpot message 726*c* such as the depicted message notifying the player that "xxx" number of other players have qualified for or won (e.g., obtained "keys") the "Community Jackpot Game", and/or a second site-wide jackpot value display

728*c* that depicts the amount of available funds that may be won via the "Community Jackpot Game". According to some embodiments, a state or status of the secondary site-wide jackpot game depicted by the third example interface 720*c* may comprise a state where the current player has not made an eligible wager and/or otherwise has not achieved a "key" to the treasure chest, but a number of other players have—e.g., and accordingly have earned chances to win the site-wide jackpot, of which, without a "key", the current player cannot share if won by the other players.

Figure 7D:
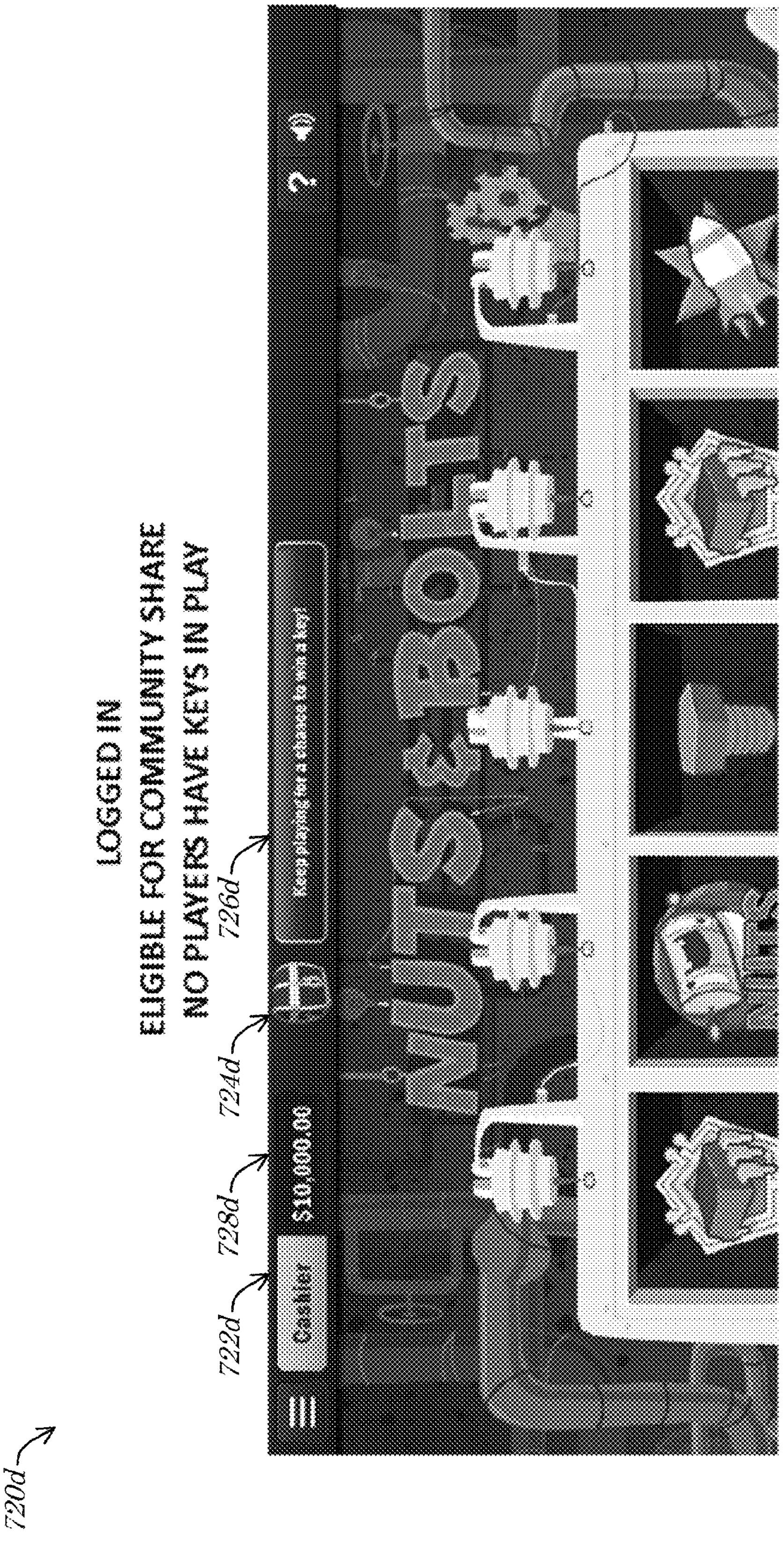

In some embodiments, a fourth example interface 720*d* depicted in FIG. 7D may comprise a screen display (e.g., screen output) that is provided and/or output to the player once the status of the secondary site-wide jackpot game has changed such that one or more other players have not yet or currently qualified to play or win the "Community Jackpot Game", but the current player (the player to which the fourth example interface 720*d* is output or provided) is eligible to achieve an entry and/or win to the "Community Jackpot Game". The fourth example interface 720*d* may comprise, for example, a fourth action button 722*d* such as the depicted "Cashier" button, a fourth site-wide jackpot icon 724*d* such as the depicted locked treasure chest, a fourth site-wide jackpot message 726*d* such as the depicted message notifying the player that the player should keep playing to win a "key", and/or a third site-wide jackpot value display 728*d* that depicts the amount of available funds that may be won via the "Community Jackpot Game". In some embodiments, a state or status of the secondary site-wide jackpot game depicted by the fourth example interface 720*d* may comprise a state where the current player has made an eligible wager but has not yet achieved a "key" to the treasure chest, and no other players have earned keys either.

Figure 7E:

According to some embodiments, a fifth example interface 720*e* depicted in FIG. 7E may comprise a screen display (e.g., screen output) that is provided and/or output to the player once the status of the secondary site-wide jackpot game has changed such that one or more other players have qualified to play or win the "Community Jackpot Game" (have earned or acquired "keys" to the treasure chest), and the current player (the player to which the fifth example interface 720*e* is output or provided) is also eligible to achieve an entry and/or win to the "Community Jackpot Game". The fifth example interface 720*e* may comprise, for example, a fifth action button 722*e* such as the depicted "Cashier" button, a fifth site-wide jackpot icon 724*e* such as the depicted locked treasure chest, a fifth site-wide jackpot message 726*e* such as the depicted message notifying the player that "xxx" number of other players have qualified for or won (e.g., obtained "keys") the "Community Jackpot Game" and that the player should keep playing to win a "key", and/or a fourth site-wide jackpot value display 728*e* that depicts the amount of available funds that may be won via the "Community Jackpot Game". According to some embodiments, a state or status of the secondary site-wide jackpot game depicted by the fifth example interface 720*e* may comprise a state where the current player has made an eligible wager and a number of other players have earned "keys" to the treasure chest, meaning that the current player may win a share of the site-wide jackpot if won by the other players (e.g., utilizing their "keys" to unlock chances to win the jackpot).

Figure 7F:
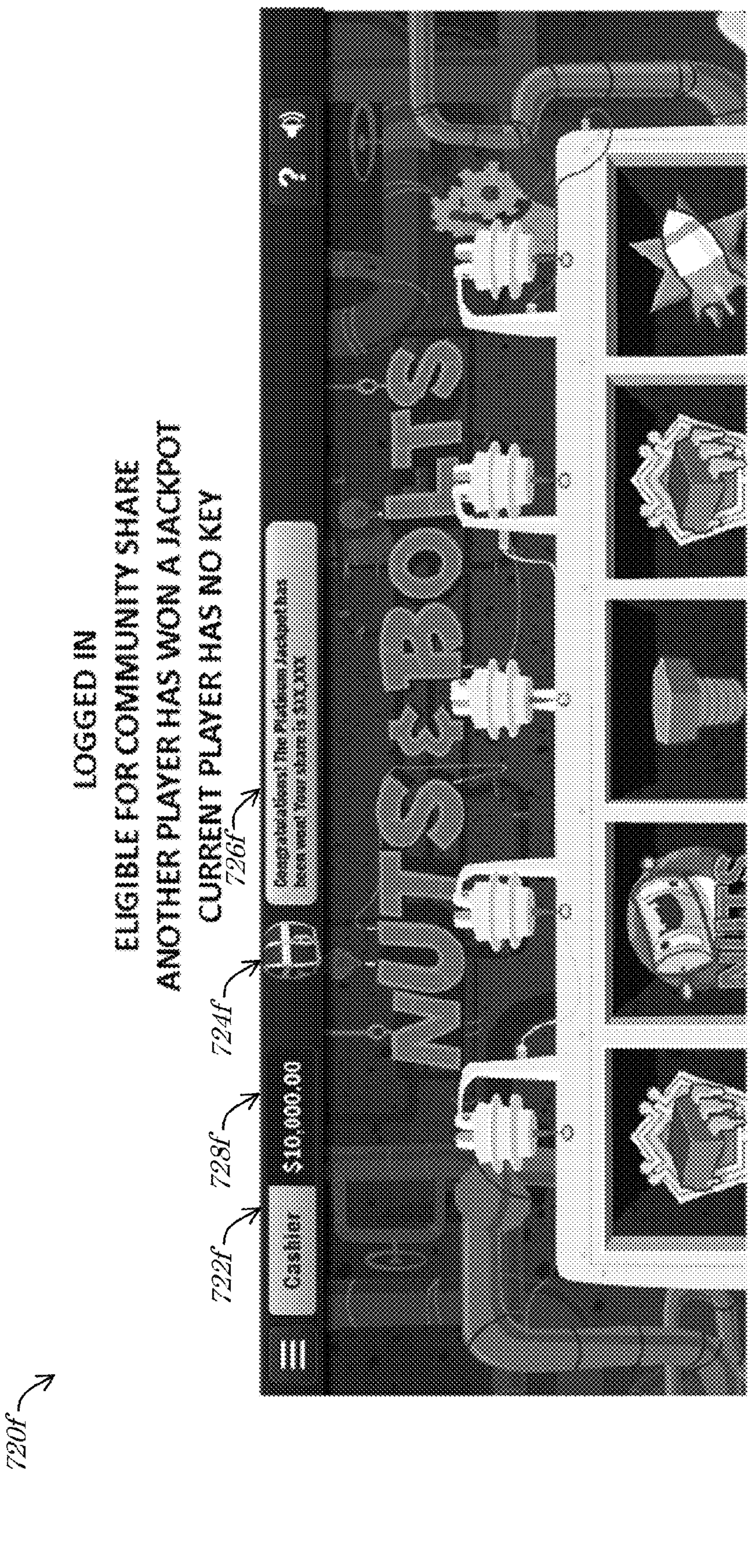

In some embodiments, a sixth example interface 720*f* depicted in FIG. 7F may comprise a screen display (e.g., screen output) that is provided and/or output to the player once the status of the secondary site-wide jackpot game has changed such that one or more other players have achieved a win in the "Community Jackpot Game" and the current player (the player to which the sixth example interface 720*f* is output or provided) is eligible for and receives a share of the site-wide jackpot from the "Community Jackpot Game". The sixth example interface 720*f* may comprise, for example, a sixth action button 722*f* such as the depicted "Cashier" button, a sixth site-wide jackpot icon 724*f* such as the depicted locked treasure chest, a sixth site-wide jackpot message 726*f* such as the depicted message notifying the player that another player has won the "Platinum" jackpot and that the current player is to receive a share of "$xx,xxx" of the site-wide jackpot, and/or a fifth site-wide jackpot value display 728*f* that depicts the amount of available funds that may be won via the "Community Jackpot Game".

Figure 7G:
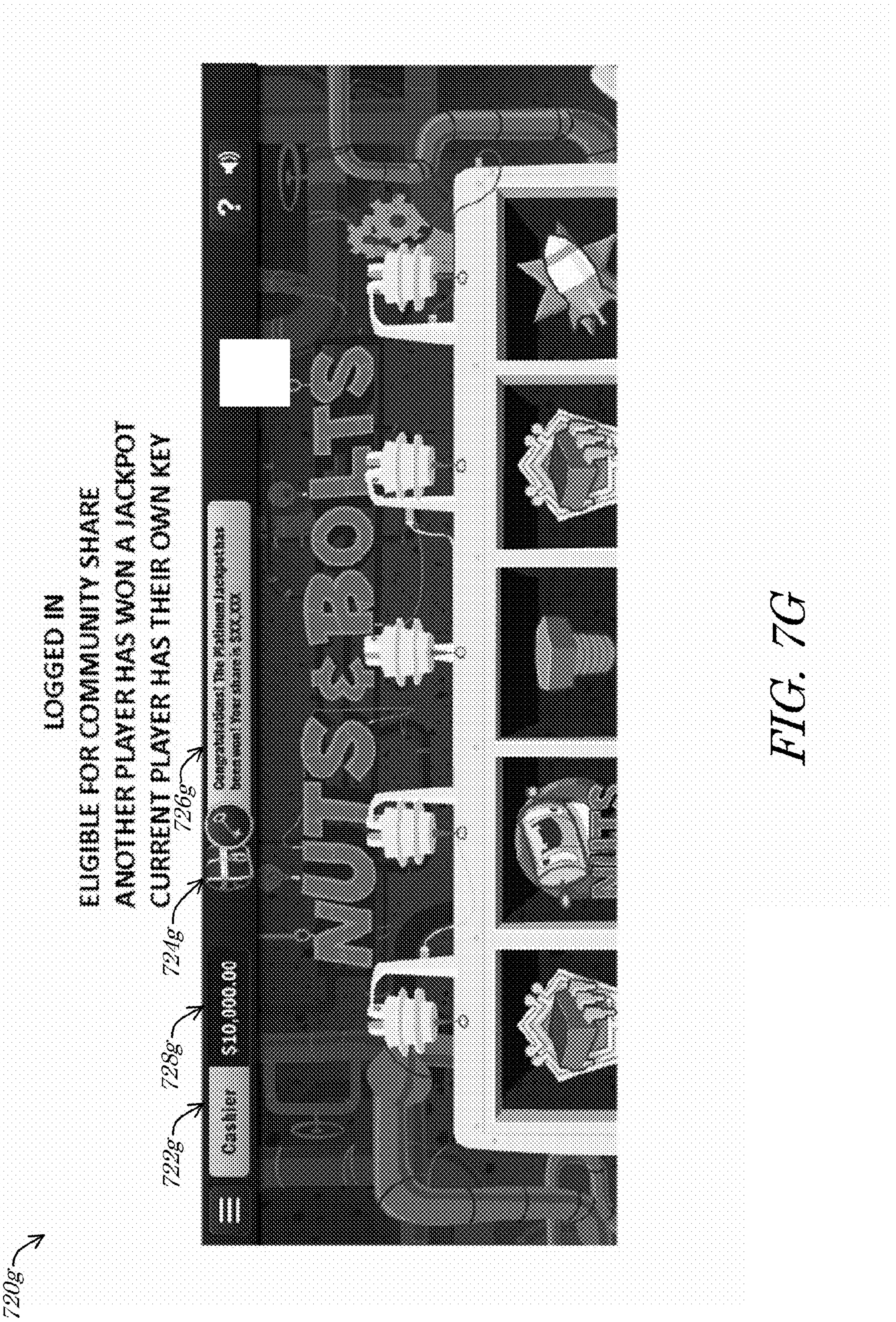

According to some embodiments, a seventh example interface 720*g* depicted in FIG. 7G may comprise a screen display (e.g., screen output) that is provided and/or output to the player once the status of the secondary site-wide jackpot game has changed such that one or more other players have achieved a win in the "Community Jackpot Game" and the current player (the player to which the seventh example interface 720*g* is output or provided) is eligible for and receives a share of the site-wide jackpot from the "Community Jackpot Game", and the current player has also achieved a "key" that may unlock the treasure chest and accordingly has a chance of earning the current player one or more site-wide jackpot wins. The seventh example interface 720*g* may comprise, for example, a seventh action button 722*g* such as the depicted "Cashier" button, a seventh site-wide jackpot icon 724*g* such as the depicted locked treasure chest along with a "key" that may be utilized to try and open the treasure chest, a seventh site-wide jackpot message 726*g* such as the depicted message notifying the player that another player has won the "Platinum" jackpot and that the current player is to receive a share of "$xx,xxx" of the site-wide jackpot, and/or a sixth site-wide jackpot value display 728*g* that depicts the amount of available funds that may be won via the "Community Jackpot Game".

Figure 7H:

In some embodiments, an eighth example interface 720*h* depicted in FIG. 7H may comprise a screen display (e.g., screen output) that is provided and/or output to the player once the status of the secondary site-wide jackpot game has changed such that the current player has achieved a "key" representing a chance to play the "Community Jackpot Game". The eighth example interface 720*h* may comprise, for example, an eighth action button 722*h* such as the depicted "Cashier" button, an eighth site-wide jackpot icon 724*h* such as the depicted locked treasure chest along with a "key" that may be utilized to try and open the treasure chest, an eighth site-wide jackpot message 726*h* such as the depicted message notifying the player that the current player has earned a chance to play the "Community Jackpot Game", and/or a seventh site-wide jackpot value display 728*h* that depicts the amount of available funds that may be won via the "Community Jackpot Game".

Figure 7I:
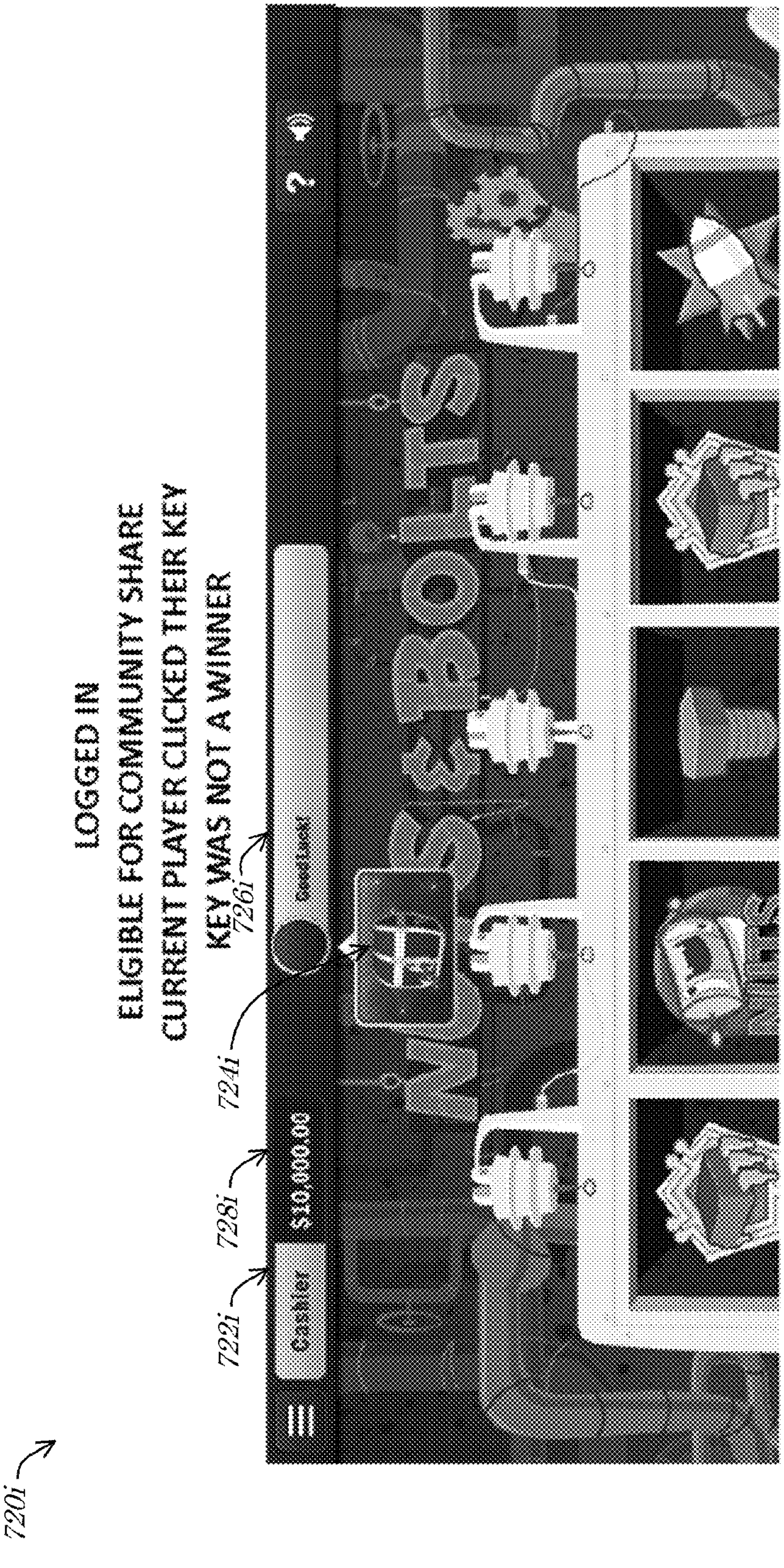

According to some embodiments, a ninth example interface 720*i* depicted in FIG. 7I may comprise a screen display (e.g., screen output) that is provided and/or output to the player once the status of the secondary site-wide jackpot game has changed such that the current player has utilized a "key" to play the "Community Jackpot Game", and lost. The ninth example interface 720*i* may comprise, for example, a ninth action button 722*i* such as the depicted "Cashier" button, a ninth site-wide jackpot icon 724*i* such as the depicted locked treasure chest that in this case was not opened by the "key" utilized by the player, a ninth site-wide jackpot message 726*i* such as the depicted message wishing the current player "Good luck" in playing the "Community Jackpot Game", and/or an eighth site-wide jackpot value display 728*i* that depicts the amount of available funds that may be won via the "Community Jackpot Game".

Figure 7J:
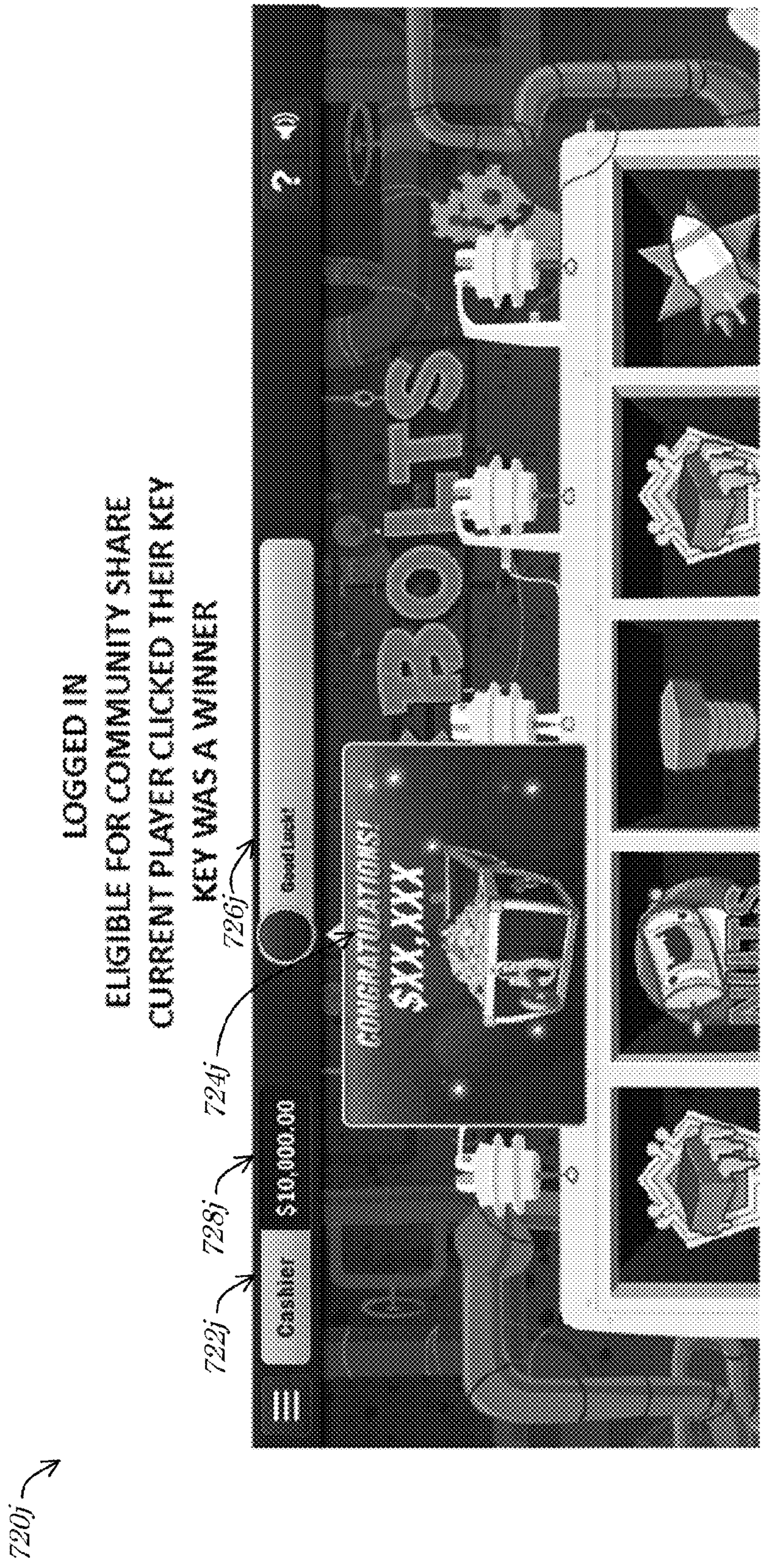

In some embodiments, a tenth example interface 720*j* depicted in FIG. 7J may comprise a screen display (e.g., screen output) that is provided and/or output to the player once the status of the secondary site-wide jackpot game has changed such that the current player has utilized a "key" to play the "Community Jackpot Game", and won. The tenth example interface 720*j* may comprise, for example, a tenth action button 722*j* such as the depicted "Cashier" button, a tenth site-wide jackpot icon 724*j* such as the depicted opened treasure chest and depicted value of the treasure earned, a tenth site-wide jackpot message 726*h* such as the depicted message wishing the current player "Good luck" in playing the "Community Jackpot Game", and/or a ninth site-wide jackpot value display 728*j* that depicts the amount of available funds that may be won via the "Community Jackpot Game".

While various components of the interfaces 720*a-j* have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

VI. Apparatus and Article of Manufacture

Figure 8:
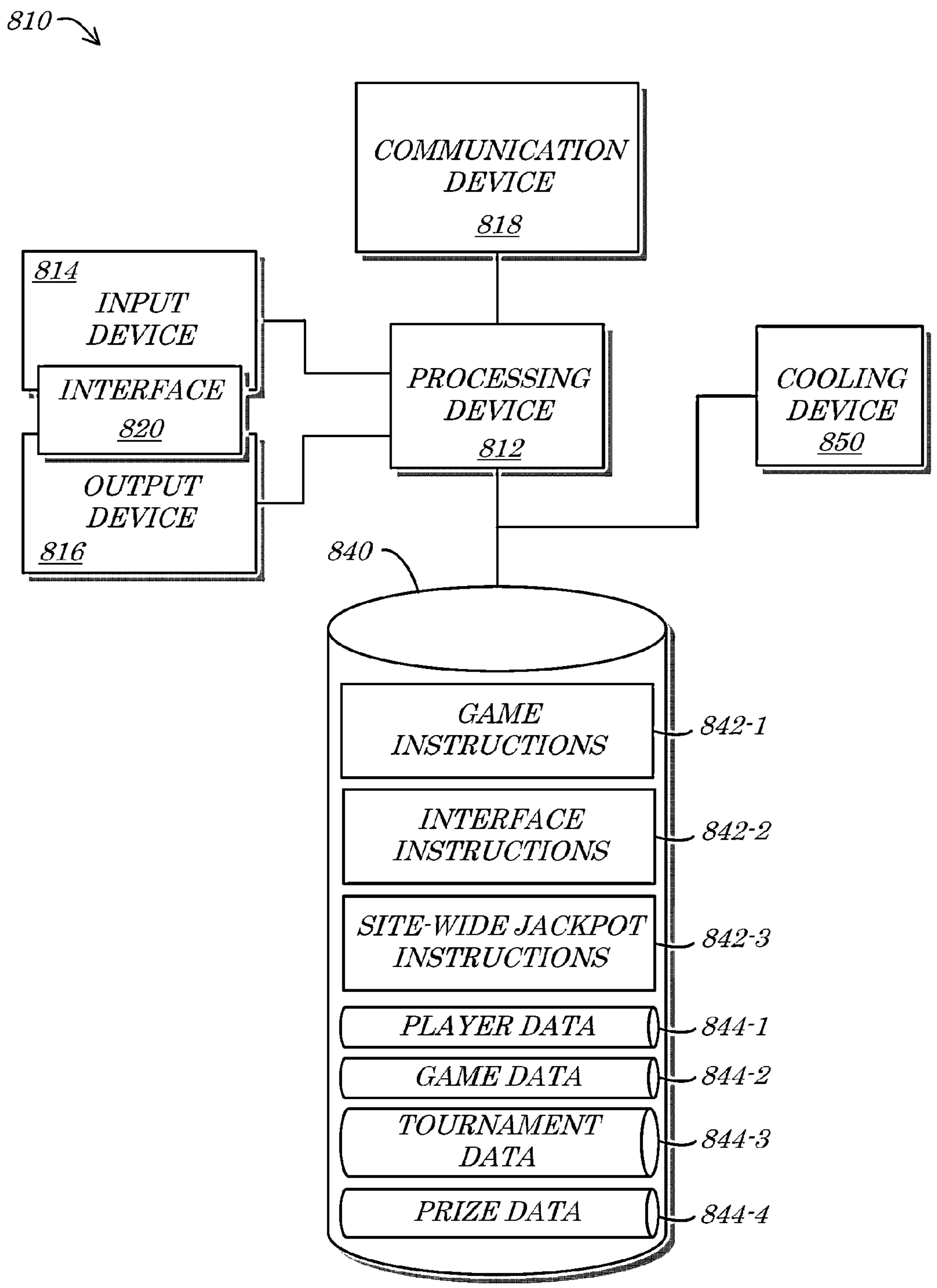
FIG. 8 is a block diagram of an apparatus according to some embodiments.
Figure 9A:
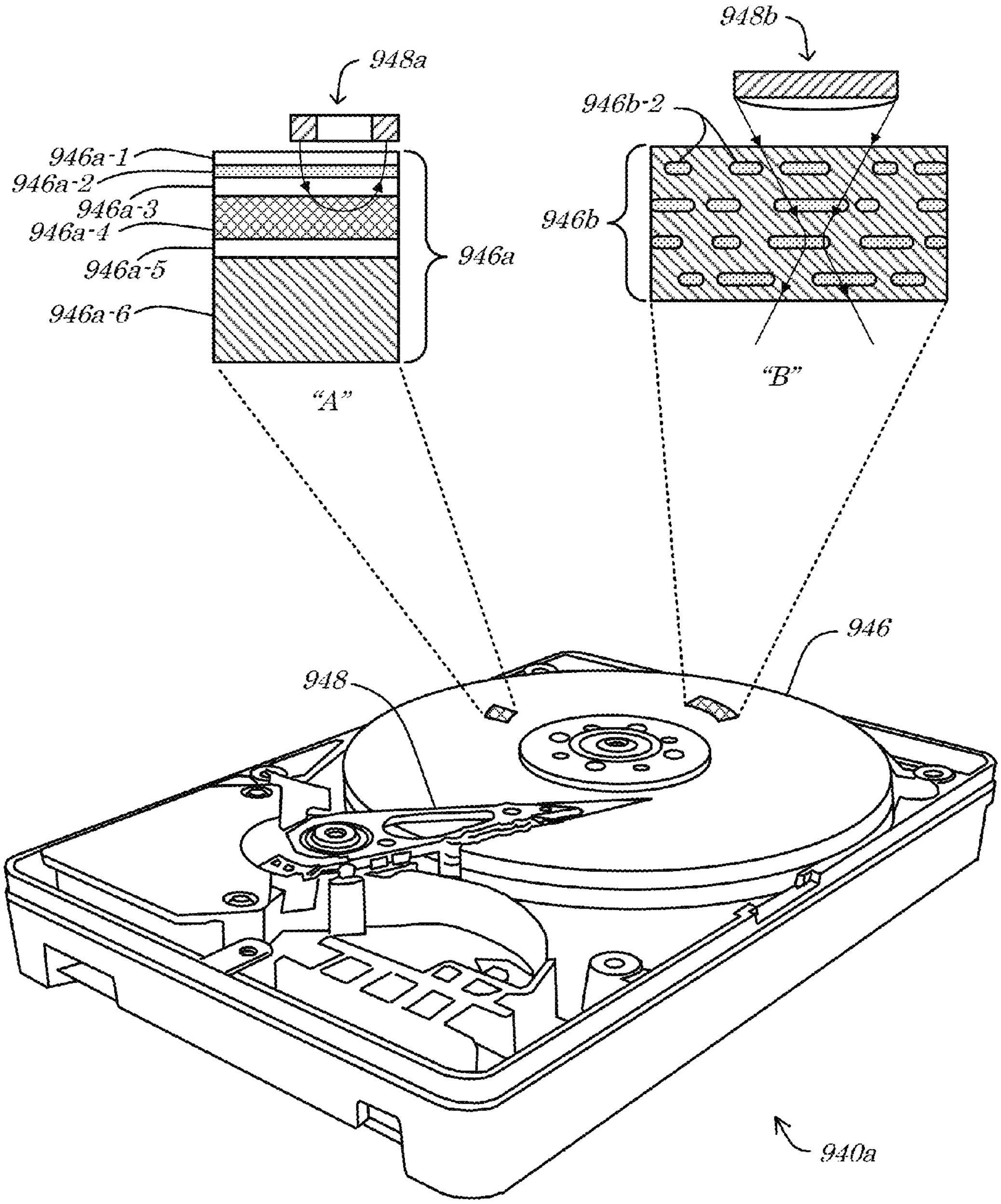
FIG. 9A, FIG. 9B, FIG. 9C, FIG. 9D, and FIG. 9E are perspective diagrams of exemplary data storage devices according to some embodiments.
Figure 9B:
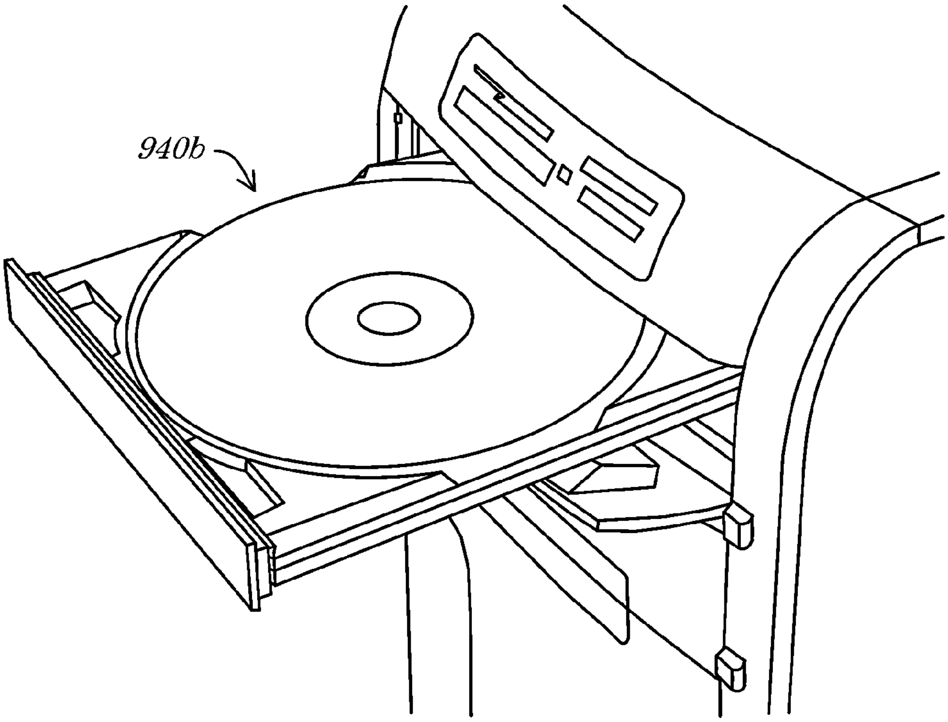
Figure 9C:
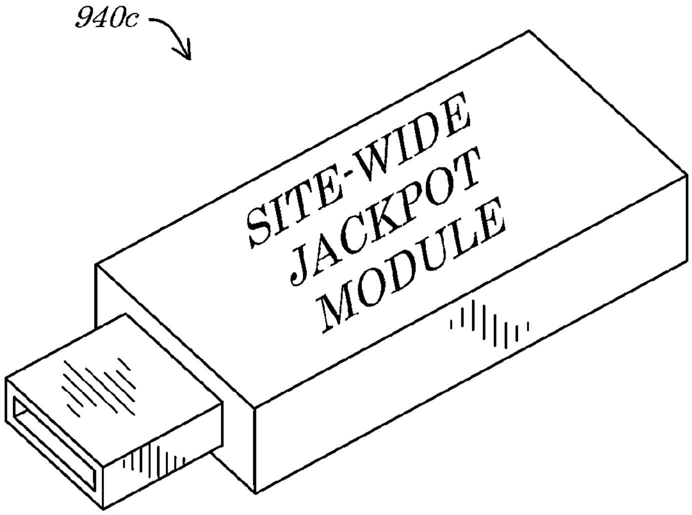
Figure 9D:
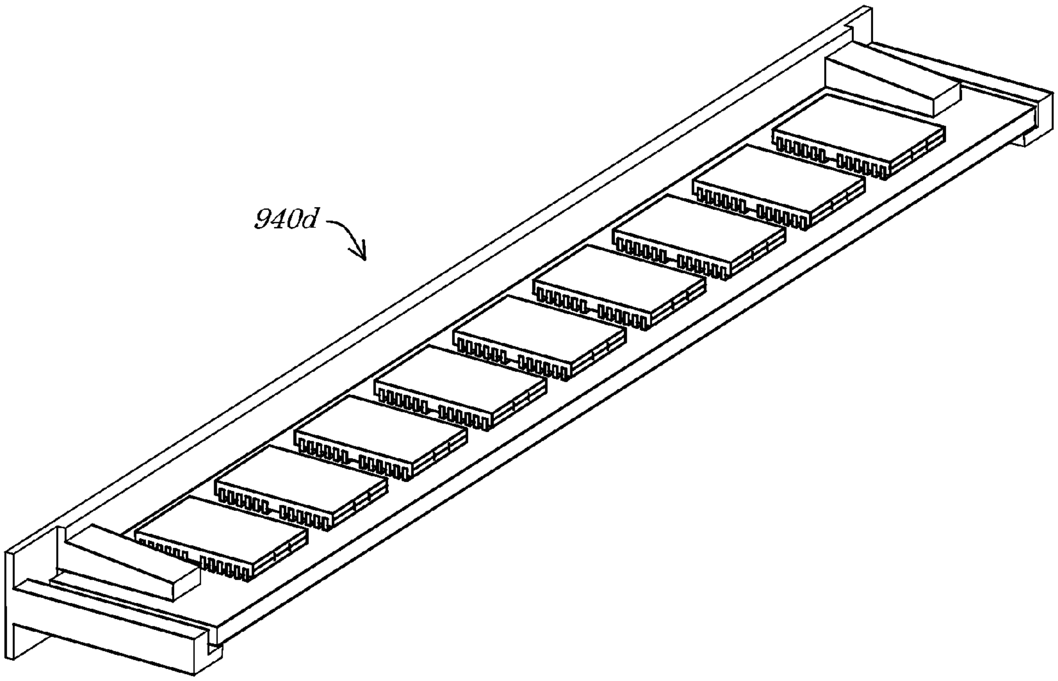
Figure 9E:
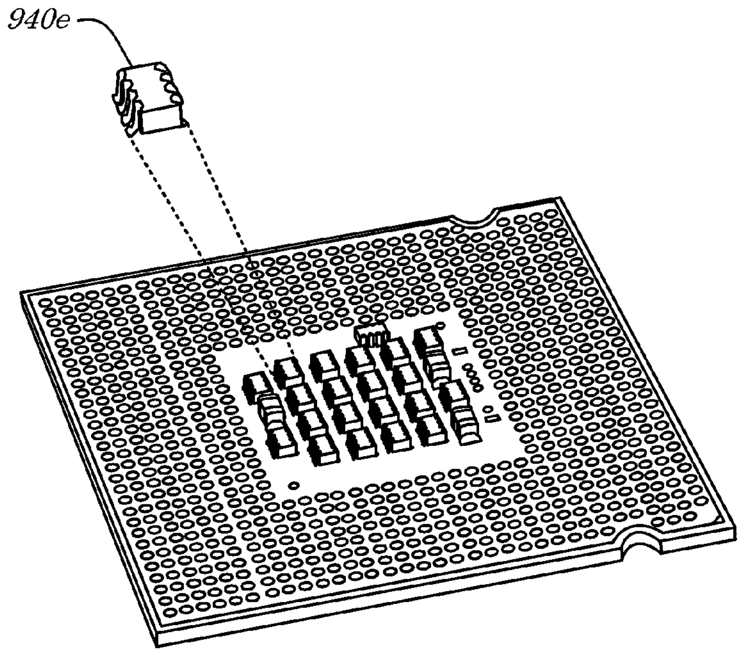

Turning to FIG. 8, a block diagram of an apparatus 810 according to some embodiments is shown. In some embodiments, the apparatus 810 may be similar in configuration and/or functionality to any of the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein, and/or may otherwise comprise a portion of the systems 100, 200, 300, 400, 500 of FIG. 1, FIG. 2, FIG. 3, FIG. 4, and/or FIG. 5 herein. The apparatus 810 may, for example, execute, process, facilitate, and/or otherwise be associated with the method 600 of FIG. 6 herein, and/or one or more portions thereof. In some embodiments, the apparatus 810 may comprise a processing device 812, an input device 814, an output device 816, a communication device 818, an interface 820, a memory device 840 (storing various programs and/or instructions 842 and/or data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 be included in the apparatus 810 without deviating from the scope of embodiments described herein.

According to some embodiments, the processing device 812 may be or include any type, quantity, and/or configuration of electronic and/or computerized processor that is or becomes known. The processing device 812 may comprise, for example, an Intel® IXP 2800 network processor or an Intel® XEON™ Processor coupled with an Intel® E7501 chipset. In some embodiments, the processing device 812 may comprise multiple inter-connected processors, microprocessors, and/or micro-engines. According to some embodiments, the processing device 812 (and/or the apparatus 810 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 810 comprises a server such as a blade server, necessary power may be supplied via a standard AC outlet, power strip, surge protector, a PDU, and/or Uninterruptible Power Supply (UPS) device.

In some embodiments, the input device 814 and/or the output device 816 are communicatively coupled to the processing device 812 (e.g., via wired and/or wireless connections and/or pathways) and they may generally comprise any types or configurations of input and output components and/or devices that are or become known, respectively. The input device 814 may comprise, for example, a keyboard that allows an operator of the apparatus 810 to interface with the apparatus 810 (e.g., by a player, such as to participate in a game having a site-wide and/or community jackpot feature as described herein). In some embodiments, the input device 814 may comprise a sensor configured to provide information such as player input to the apparatus 810 and/or the processing device 812. The output device 816 may, according to some embodiments, comprise a display screen and/or other practicable output component and/or device. The output device 816 may, for example, provide a game interface such as the interface 820 to a player (e.g., via a website; such as the example interfaces 720*a-j* of FIG. 7A, FIG. 7B, FIG. 7C, FIG. 7D, FIG. 7E, FIG. 7F, FIG. 7G, FIG. 7H, FIG. 7I, and/or FIG. 7J herein). In some embodiments, the interface 820 may comprise portions and/or components of either or both of the input device 814 and the output device 816. According to some embodiments, the input device 814 and/or the output device 816 may, for example, comprise and/or be embodied in an input/output and/or single device such as a touch-screen monitor (e.g., that enables both input and output via the interface 820).

In some embodiments, the communication device 818 may comprise any type or configuration of communication device that is or becomes known or practicable. The communication device 818 may, for example, comprise a network interface card (NIC), a telephonic device, a cellular network device, a router, a hub, a modem, and/or a communications port or cable. In some embodiments, the communication device 818 may be coupled to provide data to a player device (not shown in FIG. 8), such as in the case that the apparatus 810 is utilized to provide a game interface to a player as described herein. The communication device 818 may, for example, comprise a cellular telephone network transmission device that sends signals indicative of game interface components to customer and/or subscriber handheld, mobile, and/or telephone device. According to some embodiments, the communication device 818 may also or alternatively be coupled to the processing device 812. In some embodiments, the communication device 818 may comprise an IR, RF, Bluetooth™, and/or Wi-Fi® network device coupled to facilitate communications between the processing device 812 and another device (such as a player device and/or a third-party device).

The memory device 840 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM)

devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of game instructions 842-1, interface instructions 842-2, and/or site-wide jackpot instructions 842-3. In some embodiments, the game instructions 842-1, interface instructions 842-2, and/or site-wide jackpot instructions 842-3 may be utilized by the processing device 812 to provide output information via the output device 816 and/or the communication device 818.

According to some embodiments, the game instructions 842-1 may be operable to cause the processing device 812 to process player data 844-1, game data 844-2, tournament data 844-3, and/or prize data 844-4. Player data 844-1, game data 844-2, tournament data 844-3, and/or prize data 844-4 received via the input device 814 (and/or the interface 820) and/or the communication device 818 may, for example, be analyzed, sorted, filtered, decoded, decompressed, ranked, scored, plotted, and/or otherwise processed by the processing device 812 in accordance with the game instructions 842-1. In some embodiments, player data 844-1, game data 844-2, tournament data 844-3, and/or prize data 844-4 may be fed by the processing device 812 through one or more mathematical and/or statistical formulas and/or models in accordance with the game instructions 842-1 to provide online games having features and/or functionality in accordance with embodiments described herein.

In some embodiments, the interface instructions 842-2 may be operable to cause the processing device 812 to process player data 844-1, game data 844-2, tournament data 844-3, and/or prize data 844-4. Player data 844-1, game data 844-2, tournament data 844-3, and/or prize data 844-4 received via the input device 814 (and/or the interface 820) and/or the communication device 818 may, for example, be analyzed, sorted, filtered, decoded, decompressed, ranked, scored, plotted, and/or otherwise processed by the processing device 812 in accordance with the interface instructions 842-2. In some embodiments, player data 844-1, game data 844-2, tournament data 844-3, and/or prize data 844-4 may be fed by the processing device 812 through one or more mathematical and/or statistical formulas and/or models in accordance with the interface instructions 842-2 to provide indications of site-wide jackpot, community jackpot, and/or secondary game chances and/or results, in accordance with embodiments described herein (e.g., by defining and/or providing the example interfaces 720*a-j*, 820 of FIG. 7A, FIG. 7B, FIG. 7C, FIG. 7D, FIG. 7E, FIG. 7F, FIG. 7G, FIG. 7H, FIG. 7I, FIG. 7J, and/or FIG. 8 herein).

According to some embodiments, the site-wide jackpot instructions 842-3 may be operable to cause the processing device 812 to process player data 844-1, game data 844-2, tournament data 844-3, and/or prize data 844-4. Player data 844-1, game data 844-2, tournament data 844-3, and/or prize data 844-4 received via the input device 814 (and/or the interface 820) and/or the communication device 818 may, for example, be analyzed, sorted, filtered, decoded, decompressed, ranked, scored, plotted, and/or otherwise processed by the processing device 812 in accordance with the site-wide jackpot instructions 842-3. In some embodiments, player data 844-1, game data 844-2, tournament data 844-3, and/or prize data 844-4 may be fed by the processing device 812 through one or more mathematical and/or statistical formulas and/or models in accordance with the site-wide jackpot instructions 842-3 to provide one or more site-wide and/or community jackpots, chances at jackpots, and/or distributed payouts, in accordance with embodiments described herein Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

In some embodiments, the apparatus 810 may comprise the cooling device 850. According to some embodiments, the cooling device 850 may be coupled (physically, thermally, and/or electrically) to the processing device 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 710.

Referring now to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data such as the game instructions 842-1, interface instructions 842-2, site-wide jackpot instructions 842-3, player data 844-1, game data 844-2, tournament data 844-3, and/or prize data 844-4, each of which is described in reference to FIG. 8 herein. In some embodiments, instructions stored on the data storage devices 940*a-e* may, when executed by a processor, cause the implementation of and/or facilitate the method 600 of FIG. 6 and/or portions thereof described herein.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 946*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes known or practicable. In some embodiments, the third data storage device 940*c* may comprise a USB keyfob, dongle, and/or other type of flash memory data storage device that is or becomes know or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache such as a Level 2 (L2) cache memory device. According to some embodiments, the fifth data storage device 940*e* may comprise an on-chip memory device such as a Level 1 (L1) cache memory device.

The data storage devices 940*a-e* may generally store program instructions, code, and/or modules that, when executed by a processing device cause a particular machine to function in accordance with one or more embodiments described herein. The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an game provider may, for example, comprise various specialized computers that interact to provide for slot-style games as described herein.

VII. Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i)

a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. §101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

Computerized Processing

Various embodiments described herein provide advantages in computer processing. The number of online gaming transactions that can effectively be input, processed, and output in accordance with embodiments herein, for example, would not be possible without implementation of such embodiments in a specialized computer processing system. Such a system as described herein may, for example, enable processing of tens, hundreds, and/or thousands of gaming transactions in minutes, hours, or within a day, while such processing would not be possible in the absence of such a system. For convenience, such a specially-programmed system may be referred to herein as a "specialized computer processing system". In other words, embodiments conducted by a specialized computer processing system may not be possible to achieve in the absence of such a system and/or the speed at which such a system operates would simply not be reproducible by other available means. As a non-limiting example, a specialized computer processing system herein may be capable of receiving input descriptive of, processing, and outputting site-wide jackpot results to one thousand (1000) players in less than one (1) hour.

What is claimed is:

1. A method, comprising:

facilitating, by a processing device, gameplay of a primary wagering game conducted via a first gaming device of a first player, the primary wagering game being conducted in accordance with first stored rules defining one or more probabilities of winning one or more primary wagering game payouts;

evaluating, by the processing device and based on a probability of the first player winning a chance to play a secondary game, a wager made by the first player in the primary wagering game;

determining, by the processing device and based on the evaluation of the wager, that the first player has won a chance to play the secondary game;

providing, by the processing device and to the first gaming device of the first player, an indication of the winning of the chance to play the secondary game;

receiving, by the processing device, in response to the providing and from the first player device, an indication that the first player desires to activate the chance to play the secondary game;

facilitating, by the processing device, gameplay of the secondary game conducted via the first gaming device of the first player, the secondary game being conducted in accordance with second stored rules defining a probability of winning a secondary game jackpot;

determining, by the processing device, that the first player has won the secondary game jackpot; and awarding, via the processing device, the secondary game jackpot.

2. The method of claim 1, further comprising:

determining, by the processing device and based on a type of wagering game of the primary wagering game, the probability of the first player winning the chance to play the secondary game.

3. The method of claim 2, wherein the determining of the probability of the first player winning the chance to play the secondary game is further based on a house edge of the primary wagering game.

4. The method of claim 1, wherein the awarding comprises:

determining, by the processing device, a plurality of players that qualify to share in the secondary game jackpot; and awarding the secondary game jackpot to the first player and at least one second player of the plurality of players.

5. The method of claim 4, wherein the determining of the plurality of players that qualify to share the secondary game jackpot comprises determining that each player of the plurality of players satisfied a qualifying wager threshold for wagers placed in the primary game during a secondary game jackpot qualification period.

6. The method of claim 5, wherein the secondary game jackpot qualification period initiates upon the determination that the first player has won the secondary game jackpot and concludes after a predetermined amount of time subsequent to the initiation.

7. The method of claim 5, wherein the secondary game jackpot qualification period concludes upon the determination that the first player has won the secondary game jackpot and initiates a predetermined amount of time prior to the determination of the win.

8. A gaming system for providing site-wide jackpots via a wagering website offering a plurality of types of wagering games for play, comprising:

an electronic processing device;

a random number generator device in communication with the electronic processing device;

an electronic communications device in communication with the electronic processing device; and an electronic memory device in communication with the electronic processing device, the electronic memory device storing (i) a plurality of probabilities of winning an entry into a secondary game, each probability stored in relation to a particular type of wagering game, and (ii) instructions that when executed by the electronic processing device result in:

processing, by the electronic processing device, first gameplay of a first primary wagering game conducted via a first gaming device of a first player, the first primary wagering game being conducted in accordance with first stored rules defining one or more first probabilities of winning one or more first primary wagering game payouts;

processing, by the electronic processing device, second gameplay of a second primary wagering game conducted via a second gaming device of a second player, the second primary wagering game being conducted in accordance with second stored rules defining one or more second probabilities of winning one or more second primary wagering game payouts;

receiving, from the first gaming device and via the electronic communications device, an indication of a wager made by the first player in the first primary wagering game;

triggering, by the electronic processing device and in response to the receiving of the indication of the wager, an activation of the random number generator device;

determining, by the electronic processing device and based on (i) a result of the triggering of the random number generator device and (ii) one of the stored plurality of probabilities of winning the entry into the secondary game, that the first player has won the entry into the secondary game;

outputting, by the electronic processing device and via the electronic communications device to the first gaming device of the first player, and during continued processing of the first gameplay of the first primary wagering game, an indication of the winning of the entry into the secondary game;

receiving, by the electronic communications device and from the first gaming device of the first player, and in response to the outputting, an indication of a command from the first player to activate the entry into the secondary game;

processing, by the electronic processing device, third gameplay of the secondary game conducted via the first gaming device of the first player, the secondary game being conducted in accordance with third stored rules defining a probability of winning a secondary game jackpot;

determining, by the electronic processing device and based on the processing of the third gameplay, that the first player has won a first portion of the secondary game jackpot;

determining, by the electronic processing device and based on the processing of the second gameplay, that the second player qualifies to share a second portion of the secondary game jackpot; and awarding the first portion of the secondary game jackpot to the first player and the second portion of the secondary game jackpot to the second player, wherein the second player does not participate in gameplay of the secondary game.

9. The gaming system of claim 8, wherein the indication of the command from the first player to activate the entry into the secondary game is triggered by an activation of a graphical element of an interface provided to the first gaming device of the first player by the electronic communications device.

10. The gaming system of claim 8, wherein the secondary game jackpot is funded from funds that do not come from wagers made in either of the first or second primary wagering games.

11. The gaming system of claim 8, wherein the first portion of the secondary game jackpot is determined based on a probability of winning the secondary game.

12. The gaming system of claim 11, wherein the probability of winning the secondary game is based on a division of (i) wagers made in the first primary game by the first player multiplied by a house edge of the first primary game, by (ii) an expected value of the secondary game jackpot multiplied by the one of the stored plurality of probabilities of winning the entry into the secondary game.

13. The gaming system of claim 8, wherein the second portion of the secondary game jackpot is based on wagering activity by the second player in the second primary game and a house edge of the second primary game.

* * * * *